(12) United States Patent
Arai et al.

(10) Patent No.: US 8,311,105 B2
(45) Date of Patent: Nov. 13, 2012

(54) INFORMATION-PROCESSING APPARATUS, INFORMATION-PROCESSSING METHOD, RECORDING MEDIUM AND PROGRAM

(75) Inventors: Hideki Arai, Kanagawa (JP); Shinji Wakai, Tokyo (JP); Eiji Ueki, Kanagawa (JP); Kaoru Urata, Kanagawa (JP)

(73) Assignee: Sony Corporation, Tokyo (JP)

( * ) Notice: Subject to any disclaimer, the term of this patent is extended or adjusted under 35 U.S.C. 154(b) by 1381 days.

(21) Appl. No.: 11/732,989

(22) Filed: Apr. 5, 2007

(65) Prior Publication Data

US 2007/0286289 A1    Dec. 13, 2007

(30) Foreign Application Priority Data

Apr. 7, 2006 (JP) ............... P2006-106670
Sep. 5, 2006 (JP) ............... P2006-240255

(51) Int. Cl.
    *H04N 7/035* (2006.01)
(52) U.S. Cl. .................. 375/240.12
(58) Field of Classification Search ........... 375/E7.18, 375/E7.151, E7.179, E7.165, 240.1, 240.25, 375/E7.075, E7.026, E7.027
    See application file for complete search history.

(56) References Cited

U.S. PATENT DOCUMENTS

| 6,414,998 | B1 | 7/2002 | Yoshinari et al. |
| 6,567,471 | B1 | 5/2003 | Yoshinari |
| 2006/0045467 | A1* | 3/2006 | Fuchie ............ 386/52 |

FOREIGN PATENT DOCUMENTS

| JP | 11-289541 | 10/1999 |
| JP | 2003-52010 | 2/2003 |
| JP | 3617177 | 2/2005 |
| JP | 3736808 | 1/2006 |
| JP | 2006 67095 | 3/2006 |
| WO | WO 2006 022221 | 3/2006 |

* cited by examiner

*Primary Examiner* — Gilberto Barron, Jr.
*Assistant Examiner* — Izunna Okeke
(74) *Attorney, Agent, or Firm* — Frommer Lawrence & Haug LLP; William S. Frommer; Thomas F. Presson

(57) ABSTRACT

Disclosed herein is an information-processing apparatus for splicing an encoded stream at a splicing point set on the encoded stream, the information-processing apparatus including, a decoding unit configured to decode a part included in a re-encoding section as a part including the splicing point in order to generate a base band signal, an encoding unit configured to encode an edited signal obtained as a result of splicing the base band signal, which are generated by the decoding unit, at the splicing points in order to generate a re-encoded stream, and a control unit configured to add a predetermined section, which is included in the encoded stream as a section immediately lagging behind the re-encoding section, to the re-encoding section as a re-encoding extension of the re-encoding section in case continuity between the occupancy of the end point of the re-encoded stream generated by the encoding unit and the occupancy of a portion included in the encoded stream as a portion corresponding to the end point is not sustained.

18 Claims, 20 Drawing Sheets

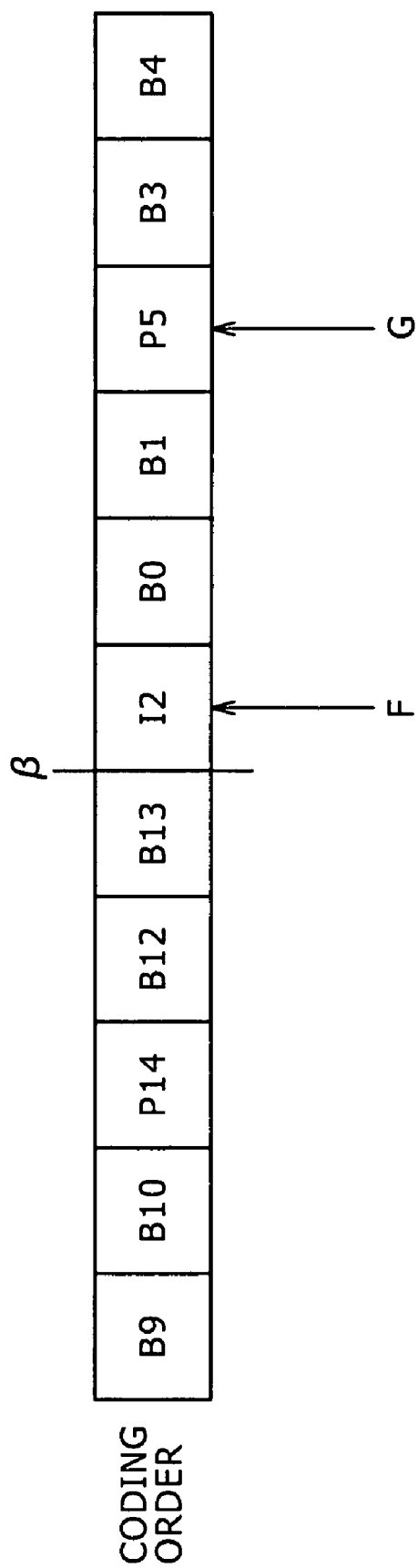

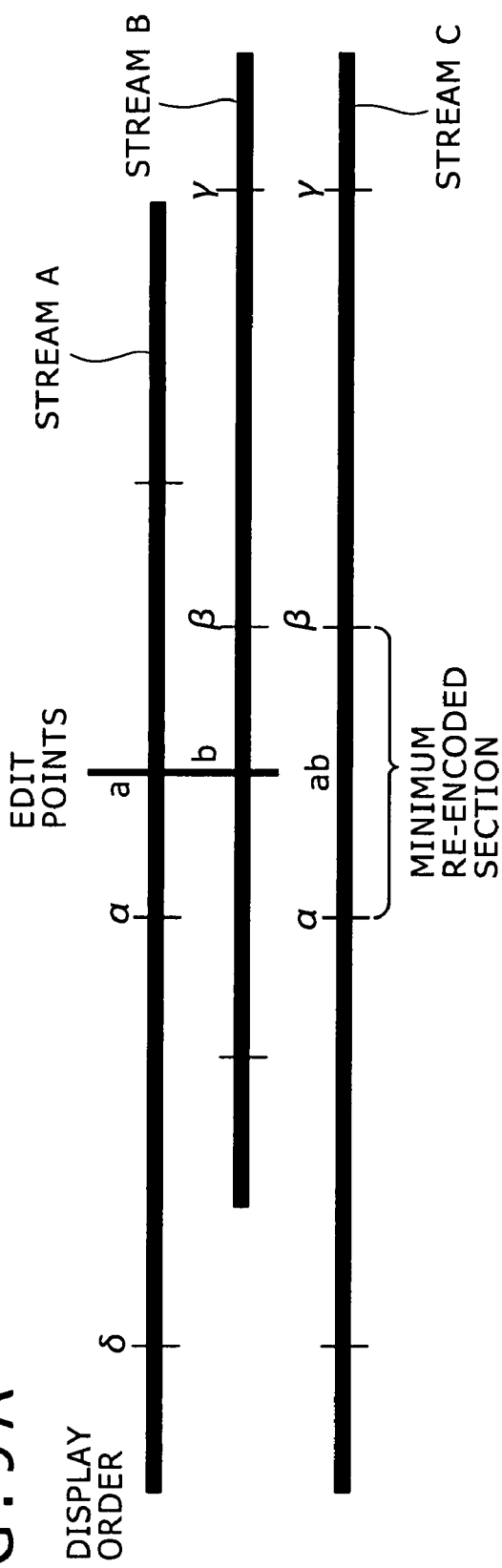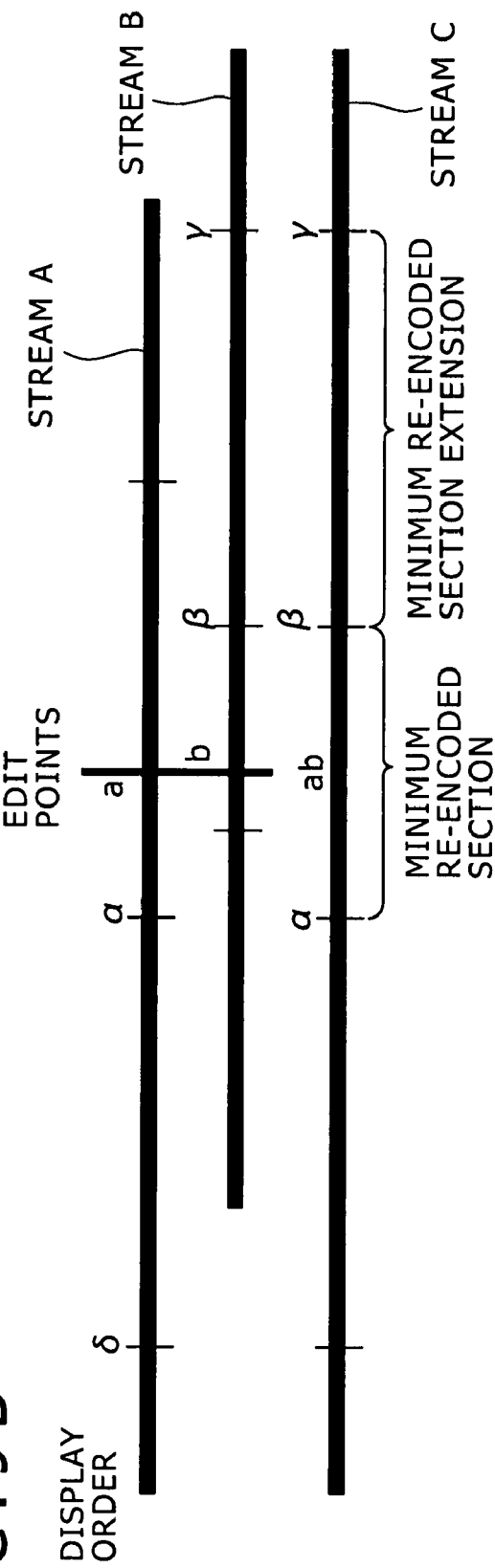

INFORMATION-PROCESSING APPARATUS, INFORMATION-PROCESSSING METHOD, RECORDING MEDIUM AND PROGRAM

CROSS REFERENCES TO RELATED APPLICATIONS

The present invention contains subject matter related to Japanese Patent Application JP 2006-106670 and JP 2006-240255 filed in the Japan Patent Office on Apr. 7, 2006 and Sep. 5, 2006, respectively, the entire contents of which being incorporated herein by reference.

BACKGROUND OF THE INVENTION

1. Field of the Invention

The present invention relates to an information processing apparatus, an information processing method, a recording medium and a program. More particularly, the present invention relates to an information-processing apparatus suitable for a process to edit video data compressed by adoption of a bi-directional inter-frame prediction technique, an information processing method adopted by the information-processing apparatus, a program for implementing the information processing method and a recording medium used for recording the program.

2. Description of the Related Art

In accordance with image compression methods represented by the MPEG (Moving Picture Coding Experts Group/Moving Picture Experts Group) technique, a video signal is subjected to a compression/coding process based on an inter-frame prediction technique in order to realize a high compression efficiency. If a process to edit an image is taken into consideration, however, an image compressed by adoption of an inter-frame prediction technique is an image represented by a signal compressed by adoption of the inter-frame prediction technique. Thus, video materials cannot be linked to each other by using the signal compressed as it is. As a result, in a system taking edition of video materials into consideration in advance, in general, the inter-frame prediction technique is not adopted. Instead, a coding process based on only an intra-image compression technique is carried out.

In a process to handle a video signal having a high degree of precision and conveying a lot of information as is the case with for example an HD (High Definition) signal, however, a coding process based on only an intra-image compression technique will result in a low compression efficiency. Thus, in order to transmit and or store data of a large amount as data compressed at a low compression efficiency, it is undesirably necessary to use an expensive system, which is at least capable of transmitting data at a high transmission speed, provided with a storage unit having a large storage capacity and capable of carrying processing at a high processing speed. That is to say, in order to handle a video signal having a high degree of precision and conveying a lot of information by making use of a low-cost system, it is necessary to raise the compression efficiency by adoption of the inter-frame prediction technique.

Related technology in the past is the one which was adopted in a process to edit an MPEG stream. In accordance with the related technology, pictures in the neighborhood of an edit point also referred to as a splicing point were decoded once to generate decompressed video signals. Then, decompressed video signals obtained as a result of the decoding process were linked to each other at the edit points. Finally, a signal obtained as a result of linking at the edit points was again encoded. (See PCT Patent Publication No. WO99/05864, hereinafter referred to as Patent Document 1)

In the MPEG technology, the compression/encoding method adopting the bi-directional inter-frame prediction technique is referred to as a long GOP (Group of Picture) method since a video stream subjected to the compression/encoding process based on the bi-directional inter-frame prediction technique is converted into a sequence of I pictures, P pictures and B pictures.

An I picture is a picture obtained as a result of an intra-frame encoding process. Thus, an I picture can be encoded independently of other screens (frames or pictures). That is to say, an I picture can be decoded on the basis of only information conveyed by the picture itself. A P picture is a picture obtained as a result of an inter-frame forward-directional prediction encoding process. To be more specific, a P picture is obtained as a result of a forward-directional prediction encoding process as a picture expressed in terms of differences from a preceding frame. A B picture is a picture obtained as a result of an inter-frame bi-directional prediction encoding process.

The amount of data contained in a P and B picture is small in comparison with an I picture. Thus, for a long GOP of a stream or a large number of pictures composing a long GOP of a stream, the compression efficiency of the pictures of the stream cannot be increased. For this reason, the inter-frame prediction technique is suitable for utilization of digital broadcasting and a DVD (Digital Versatile Disk) video. If the GDP is excessively long, however, the editing control at frame precision becomes difficult to execute, particularly, in an editing work for a business application.

By referring to FIG. 1, the following description explains a process to link two pieces of video data, which has been compressed by adoption of the long GOP method, at predetermined edit points.

First of all, a portion included in edit-object compressed data 1 as a portion in the vicinity of an edit point of the edit-object compressed data 1 and a portion included in edit-object compressed data 2 as a portion in the vicinity of at an edit point of the edit-object compressed data 2 are subjected to a partial decoding process to produce a partial decompressed video signal 1 and a partial decompressed video signal 2. Then, the partial decompressed video signal 1 and the partial decompressed video signal 2 are linked to each other at the edit points in order to generate an edited signal. If necessary, an effect process is carried out in the vicinity of the edit points and, subsequently, a re-encoding process is performed on the edited signal to generate compressed and encoded video data. Then, the compressed and encoded video data obtained as a result of the re-encoding process is linked to compressed and encoded video data not subjected to the partial decoding process and the re-encoding process. The compressed and encoded video data not subjected to the partial decoding process and the re-encoding process is video data other than the portion included in the edit-object compressed data 1 as a portion in the vicinity of the edit point of the edit-object compressed data 1 and other than the portion included in the edit-object compressed data 2 as a portion in the vicinity of the edit point of the edit-object compressed data 2.

By virtue of the method explained above by referring to FIG. 1, it is possible to confine picture deteriorations caused by the re-encoding process to portions in the vicinity of the edit points and possible to substantially shorten the editing time in comparison with the method whereby, after compressed video data to be edited is all subjected to a decoding process, video signals obtained as a result of the decoding process are linked to each other at edit points to produce an edited signal, and the edited signal is again subjected to a re-encoding process to generate edited compressed video data.

SUMMARY OF THE INVENTION

In the editing process described above, after portions in the vicinity of edit points are subjected a decoding process to produce decompressed video signals, the decompressed video signals are linked to each other at the edit points to generate a linked decompressed video signal, which is then subjected to a re-encoding process to generate edited compressed video data. Subsequently, the compressed video data obtained as a result of the re-encoding process is joined to compressed video data not subjected to the partial decoding process and the re-encoding process. In the editing process described above, however, it is necessary to sustain continuity of VBV buffer occupancy between the compressed data obtained as a result of the re-encoding process and the compressed video data not subjected to the partial decoding process and the re-encoding process.

The continuity of VBV buffer occupancies is explained by referring to FIG. 2 as follows.

In order to prevent the VBV buffer for the compressed video data obtained as a result of an editing process from collapsing, it is necessary to adjust the occupancy of the start of the compressed data obtained as a result of a re-encoding process to agree with the occupancy of the end of compressed data leading ahead of the re-encoded compressed data as compressed data not subjected to the decoding process and the re-encoding process. By the same token, it is necessary to adjust the occupancy of the end of the compressed data obtained as a result of the re-encoding process to agree with the occupancy of the start of compressed data lagging behind the re-encoded compressed data as compressed data not subjected to the decoding process and the re-encoding process. In FIG. 2, symbol E denotes the compressed data obtained as a result of the re-encoding process, symbol C denotes the occupancy of an I picture, which is the start of the compressed data E. Symbol A denotes the occupancy of the end of compressed data 1 leading ahead of the re-encoded compressed data E to serve as the video material to be edited. Thus, control needs to be executed to make the occupancy C agree with the occupancy A. On the other hand, symbol D denotes the occupancy of an I picture immediately lagging behind the compressed data E to serve as the end of the compressed data E. Symbol B denotes the occupancy of the start of compressed data 2 lagging behind the re-encoded compressed data E to serve as the video material to be edited. Thus, control needs to be executed to make the occupancy D agree with the occupancy B.

For both a closed GOP the occupancy in front of every edit point may be necessary to be made agree with the occupancy after the edit point in the same way as an open GOP, which is not a closed GOP. If the continuity of the VBV buffer occupancies is not sustained, the buffer of the decoder collapses at a decoding time, possibly causing a phenomenon such as a picture skip or a freeze.

In a PS (program stream) or a TS (transport stream), the VBV buffer occupancy of every picture can be found from an SCR (system clock reference) or a PCR (Program Clock Reference), a PTS (Presentation Time Stamp) and a DTS (Decoding Time Stamp). In an ES (elementary system), however, the VBV buffer occupancy cannot be found with ease.

In an ES, the VBV buffer occupancy of each picture can be found from the value of a VDV delay from the picture header. Since the parameter representing a VBV delay of the picture heard does not necessarily have a correct value, however, the value of the occupancy computed from the parameter representing a VDV delay cannot be reliable or accurate. In addition, in the case of an ES encoded at a VBR (Variable Bit Rate), the value of the VBV delay is fixed. Thus, the value of a VDV delay cannot be used to find a VBV buffer occupancy.

As described above, in an ES, the VBV buffer occupancy cannot be found with ease. Thus, in a process to edit an ES, a re-encoding process may not be carried out correctly so as to sustain the continuity of the VBV buffer occupancies. In this case, the buffer undesirably overflows or underflows so that it is feared that a decoded image undesirably exhibits a phenomenon such as a picture skip or a freeze.

In a system for producing a broadcast program, for example, a phenomenon such as a picture skip or a freeze is not permitted to appear on a video image. In the past, however, in a process to edit an ES including no inserted time stamp, the continuity of the VBV buffer occupancies could not be sustained.

Addressing the problems described above, inventors of the present invention have innovated an information-processing apparatus capable of sustaining the continuity of the VBV buffer occupancies in a process to edit an ES.

According to one embodiment of the present invention, there is provided an information-processing apparatus for splicing a first encoded stream and a second encoded stream at a first splicing point set on the first encoded stream and a second splicing point set on the second encoded stream, the information-processing apparatus including, a decoding unit configured to decode a first part included in a re-encoding section as a part including the first splicing point set on the first encoded stream in order to generate a first base band signal and a second part included in the re-encoding section as a part including the second splicing point set on the second encoded stream in order to generate a second base band signal, an encoding unit configured to encode an edited signal obtained as a result of splicing the first base band signal and the second base band signal, which are generated by the decoding unit, at the first and second splicing points in order to generate a re-encoded stream, and a control unit configured to add a predetermined section, which is included in the second encoded stream as a section immediately lagging behind the re-encoding section, to the re-encoding section as a re-encoding extension of the re-encoding section in case continuity between the occupancy of the end point of the re-encoded stream generated by the encoding unit and the occupancy of a portion included in the second encoded stream as a portion corresponding to the end point is not sustained.

According to another embodiment of the present invention, there is provided an information processing method for splicing a first encoded stream and a second encoded stream at a first splicing point set on the first encoded stream and a second splicing point set on the second encoded stream, the information-processing method including the steps of, decoding a first part included in a re-encoding section as a part including the first splicing point set on the first encoded stream in order to generate a first base band signal and a second part included in the re-encoding section as a part including the second splicing point set on the second encoded stream in order to generate a second base band signal, encoding an edited signal obtained as a result of splicing the first base band signal and the second base band signal at the first and second splicing points in order to generate a re-encoded stream, and adding a predetermined section, which is included in the second encoded stream as a section immediately lagging behind the re-encoding section, to the re-encoding section as a re-encoding extension of the re-encoding section in case continuity between the occupancy of the end point of the re-encoded stream and the occupancy of a portion included in the second encoded stream as a portion corresponding to the end point is not sustained.

According to yet another embodiment of the present invention, there is provided an information-processing apparatus for splicing a first encoded stream and a second encoded stream at a first splicing point set on the first encoded stream and a second splicing point set on the second encoded stream, the information-processing apparatus including, a decoding unit configured to decode a first part included in a re-encoding section as a part including the first splicing point set on the first encoded stream in order to generate a first base band signal and a second part included in the re-encoding section as a part including the second splicing point set on the second encoded stream in order to generate a second base band signal, an encoding unit configured to encode an edited signal obtained as a result of splicing the first base band signal and the second base band signal at the first and second splicing points in order to generate a re-encoded stream, and a control unit configured to take a section starting from the start position of a GOP including the first splicing point set on the first encoded stream and ending at the end position of a GOP including the second splicing point set on the second encoded stream as a reference re-encoding section and determine the re-encoding section on the basis of the number of pictures included in the reference re-encoding section.

According to yet another embodiment of the present invention, there is provided an information processing method for splicing a first encoded stream and a second encoded stream at a first splicing point set on the first encoded stream and a second splicing point set on the second encoded stream, the information-processing method including the steps of:

decoding a first part included in a re-encoding section as a part including the first splicing point set on the first encoded stream in order to generate a first base band signal and a second part included in the re-encoding section as a part including the second splicing point set on the second encoded stream in order to generate a second base band signal, encoding an edited signal obtained as a result of splicing the first base band signal and the second base band signal at the first and second splicing points in order to generate a re-encoded stream, and taking a section starting from the start position of a GOP including the first splicing point set on the first encoded stream and ending at the end position of a GOP including the second splicing point set on the second encoded stream as a reference re-encoding section and determining the re-encoding section on the basis of the number of pictures included in the reference re-encoding section.

BRIEF DESCRIPTION OF THE DRAWINGS

These and other objects and features of the present invention will become clear from the following description of the preferred embodiments given with reference to the accompanying diagrams, in which:

FIG. 8 is an explanatory diagram to be referred to in description of a re-encoding termination process;

FIGS. 9A and 9B are each an explanatory diagram to be referred to in description of a process to extend a minimum re-encoding section;

DETAILED DESCRIPTION OF THE PREFERRED EMBODIMENTS

Embodiments of the present invention are explained by referring to diagrams as follows.

Figure 1:
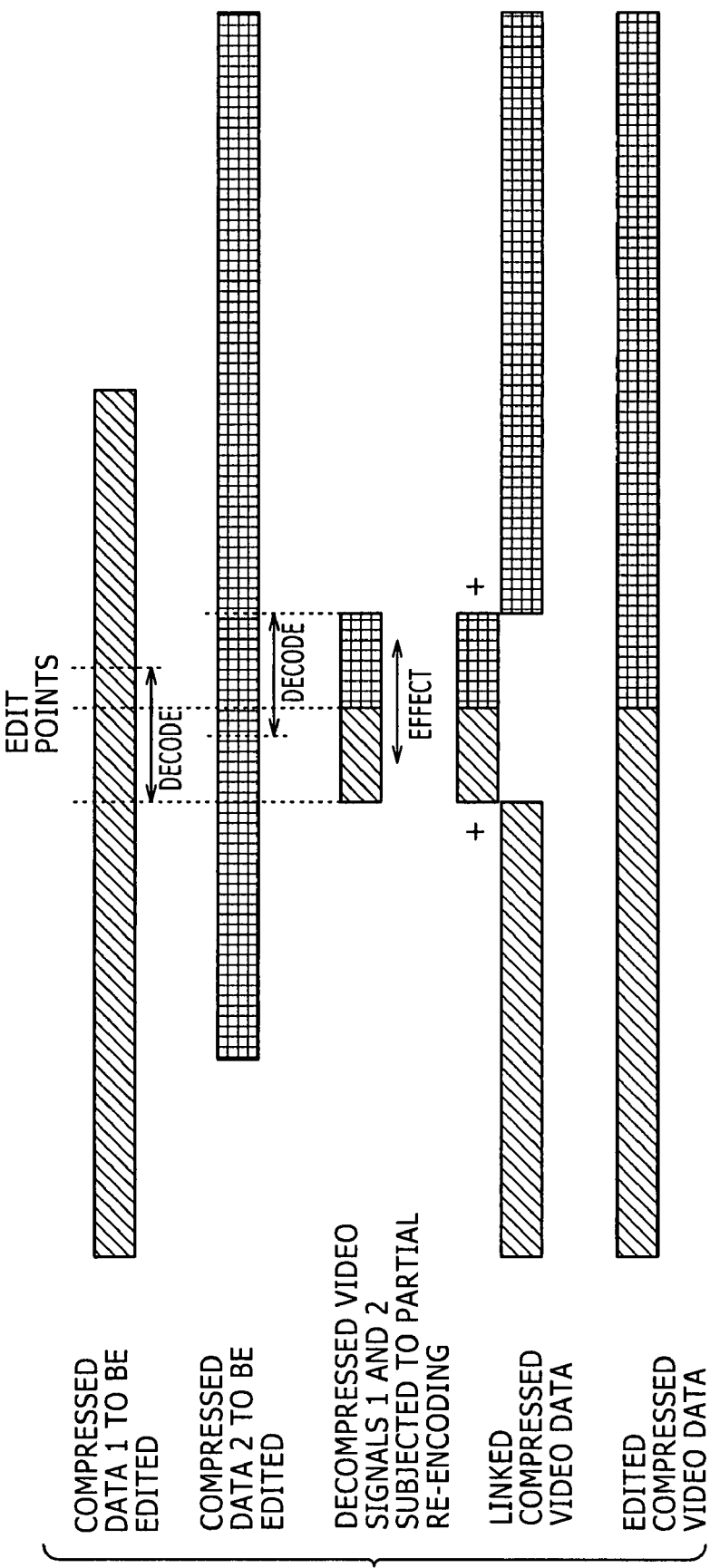
FIG. 1 is an explanatory diagram to be referred to in description of editing and partial re-encoding processes.
Figure 2:
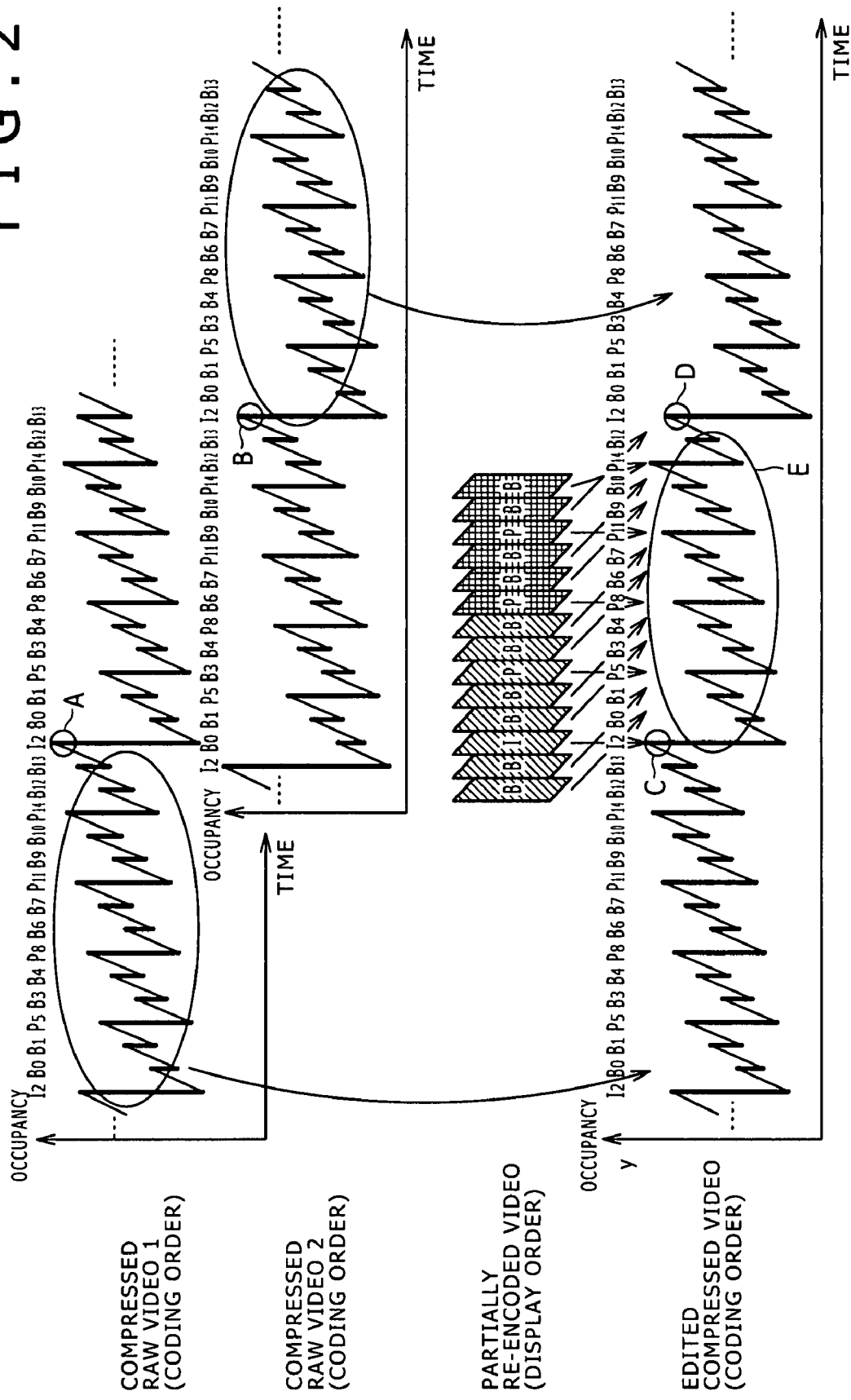
FIG. 2 is an explanatory diagram showing a VBV buffer for a case in which editing and partial re-encoding processes are carried out.
Figure 3:
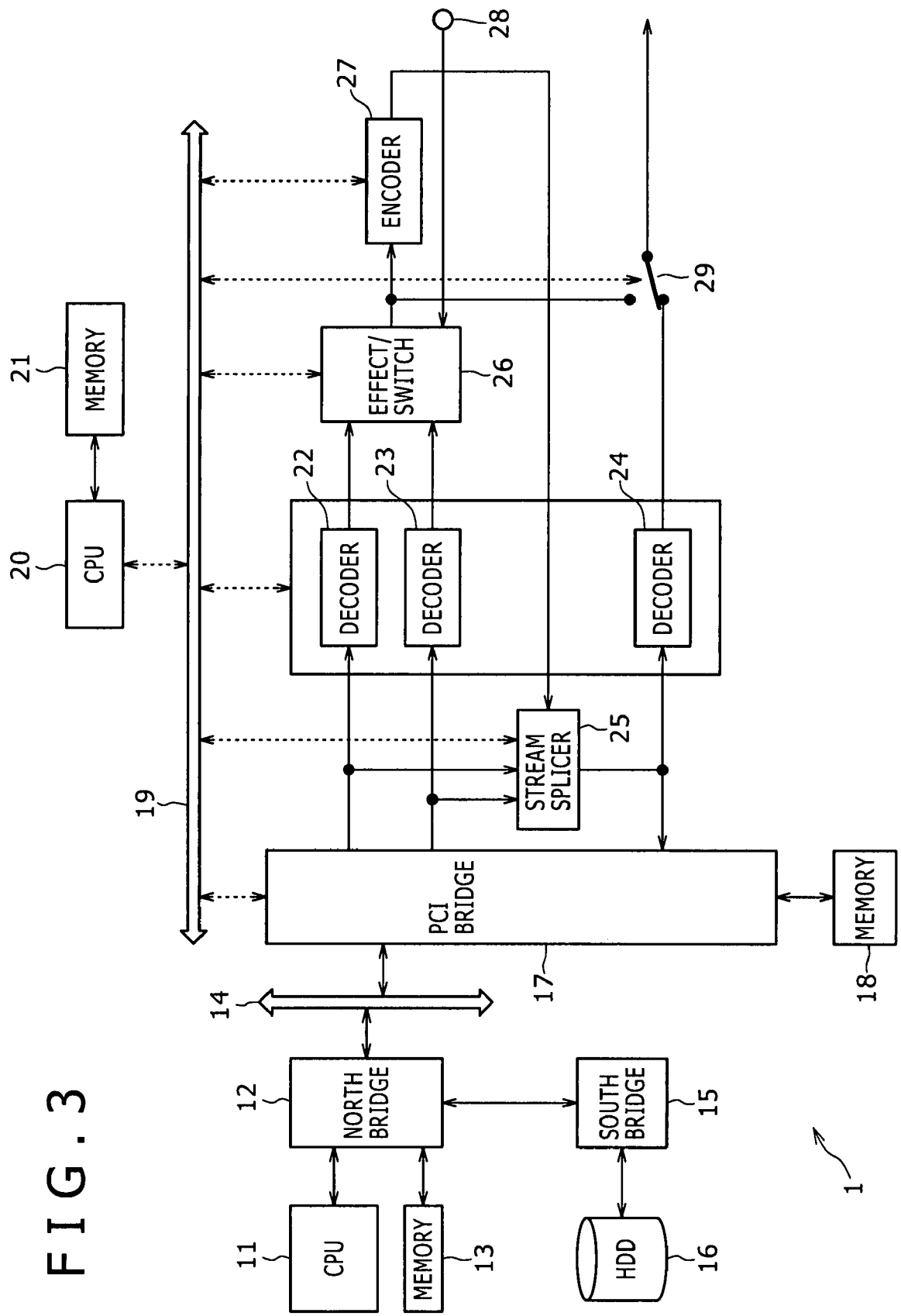
FIG. 3 is a block diagram showing the configuration of an editing apparatus.

FIG. 3 is a block diagram showing the hardware configuration of an editing apparatus 1 to which the present invention is applied.

As shown in the figure, a CPU (Central Processing Unit) 11 is connected to a north bridge 12. The CPU 11 is a unit for carrying out processing such as control of operations to read out data from an HDD (Hard Disk Drive) 16 as well as operations to write data into the HDD 16 and processes to generate a control signal as well as a command, which are used for controlling an edit process carried out by another CPU 20, and output the generated control signal as well as the generated command to other units. Connected to a PCI (Peripheral Component Interconnect/Interface) bus 14, the north bridge 12 is a unit for typically receiving data from the HDD 16 through a south bridge 15 and supplying the data to a memory 18 by way of the PCI 14 and a PCI bridge 17 in accordance with control executed by the CPU 11. In addition, the north bridge 12 is also connected to a memory 13 and facilitates transfers of necessary data in the processing carried out by the CPU 11 between the CPU 11 and the memory 13.

The memory 13 is a storage unit used for storing the necessary data in the processing carried out by the CPU 11. The south bridge 15 is a unit for controlling operations to read out data from the HDD 16 as well as operations to write data into the HDD 16. The HDD 16 is a storage unit used for storing compressed and coded data serving as a material to be edited.

The PCI bridge 17 is a unit for controlling operations to read out data from the memory 18 as well as operations to write data into the memory 18, operations to supply compressed and coded data to decoders 22 to 24 or a stream splicer 25 and operations to exchange data between the PCI bus 14 and a control bus 19. The memory 18 is a storage unit used for storing data read out by the HDD 16 in accordance with control executed by the PCI bridge 17. The data stored in the memory 18 includes compressed and coded data serving as a material to be edited and compressed and coded data received from the stream splicer 25 as a result of an edit process.

The other CPU 20 is a unit for controlling processes carried out by the PCI bridge 17, the decoders 22 to 24, the stream splicer 25, an effect/switch 26, an encoder 27 and a switch 29 in accordance with a command signal and a command, which are received from the CPU 11 through the north bridge 12, the PCI bus 14, the PCI bridge 17 and the control bus 19. A memory 21 is a storage unit used for storing necessary data in processing carried out by the other CPU 20.

The decoders 22 to 24 are each a unit for decompressing and decoding compressed and coded input data and outputting a decompressed and decoded video signal obtained as a result of the decompression/decoding process in accordance with control executed by the other CPU 20. The decoders 22 to 24 can also each be provided as an independent unit not included in the editing apparatus 1. For example, if the decoder 24 is provided as an independent unit, the decoder 24 receives compressed edited video data obtained as a result of an edit process to be described later, decodes the data and outputs a result of the decoding process.

The stream splicer 25 is a unit for supplying an encoded input stream of compressed video data to the decoder 24 and the memory 18 used for saving the data by way of the PCI bridge 17 in accordance with control executed by the other CPU 20. In addition, the stream splicer 25 also receives data obtained as a result of an encoding process carried out by the encoder 27 from the encoder 27 and supplies the data to the memory 18 used for saving the data by way of the PCI bridge 17.

The effect/switch 26 is a unit for selecting one of inputs supplied thereto in accordance with control executed by the other CPU 20 and outputting a signal corresponding to the selected input to the encoder 27. The inputs to be selected include decompressed video signals output by the decoders 22 and 23 or supplied from an input terminal 28. That is to say, the effect/switch 26 joins the input decompressed video signals by making use of a predetermined frame and, if necessary, carries out an effect process in a predetermined range. In addition, the effect/switch 26 also supplies the decompressed video signal received from the input terminal 28 to the encoder 27. The encoder 27 is a unit for encoding a decompressed video signal received from the effect/switch 26 in accordance with control executed by the other CPU 20.

The switch 29 is a switch for selecting a base band video signal received from the effect/switch 26 or a base band video signal received from the decoder 24, which receives its input from the stream splicer 25, and outputting the selected signal to an external recipient such as a display apparatus in accordance with control executed by the other CPU 20.

Next, the operation of the editing apparatus 1 is explained.

The HDD 16 is a storage unit used for storing a plurality of pieces of video data serving as raw data, which has been compressed and coded in accordance with an open GOP method provided for long GOPs. The CPU 11 receives an input from the user through an operation input unit not shown in the figure. The input includes information on two streams A and B to be edited and information on two edit points set on the two streams A and B respectively.

The CPU 11 determines a section, data of which is to be re-encoded, from the streams A and B on the basis of the GOP structures of the streams A and B as well as the information on the edit points. The streams A and B are each compressed and coded video data serving as raw data.

At that time, the CPU 11 firstly determines a minimum re-encoded section as the section, data of which is to be re-encoded. A process to determine the minimum re-encoded section is explained by referring to FIGS. 4 to 6 as follows.

Figure 4:
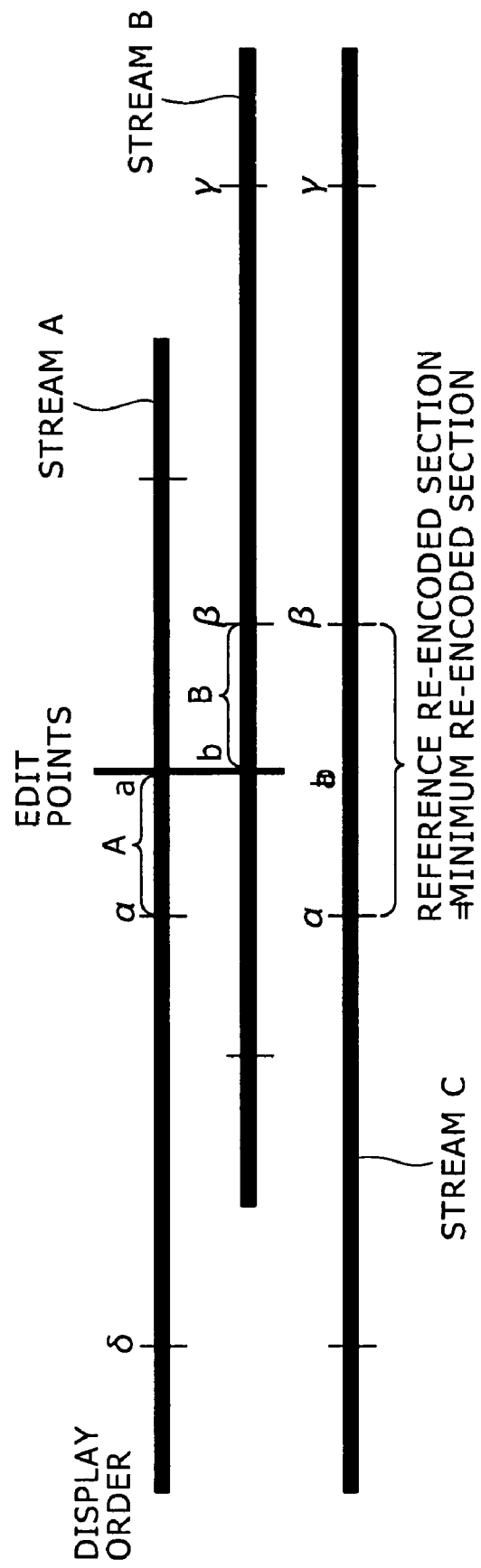
FIG. 4 is an explanatory diagram to be referred to in description of a process to set a minimum re-encoding section.

As shown in FIG. 4, symbol a denotes the start position of a GOP including an edit point a on the stream A whereas and symbol β denotes the end position of a GOP including an edit point b on the stream B. Let us assume that a stream C is generated by linking the streams A and B to each other at the edit points a and b. In this case, a reference re-encoded section on the stream C is defined as a section between the start position α of the stream A and the end position β of the stream B. The reference re-encoded section includes the edit points a and b.

The number of frames included in the reference re-encoded section, which is determined between the start position α and the end position β as a section including the edit points a and b, is A+B, where symbol A denotes the number of frames included in the reference re-encoded section between the start position α and the edit point a on the A-stream side whereas symbol B denotes the number of frames included in the reference re-encoded section between the edit point b and the end position β on the B-stream side. Let us assume that symbol N denotes the number of frames included in a GOP serving as a reference on these streams. If the frame count (A+B) satisfies the relation N/2≦(A+B)≦N, the reference re-encoded section is taken as the minimum re-encoded section as it is as shown in FIG. 4.

Figure 5:
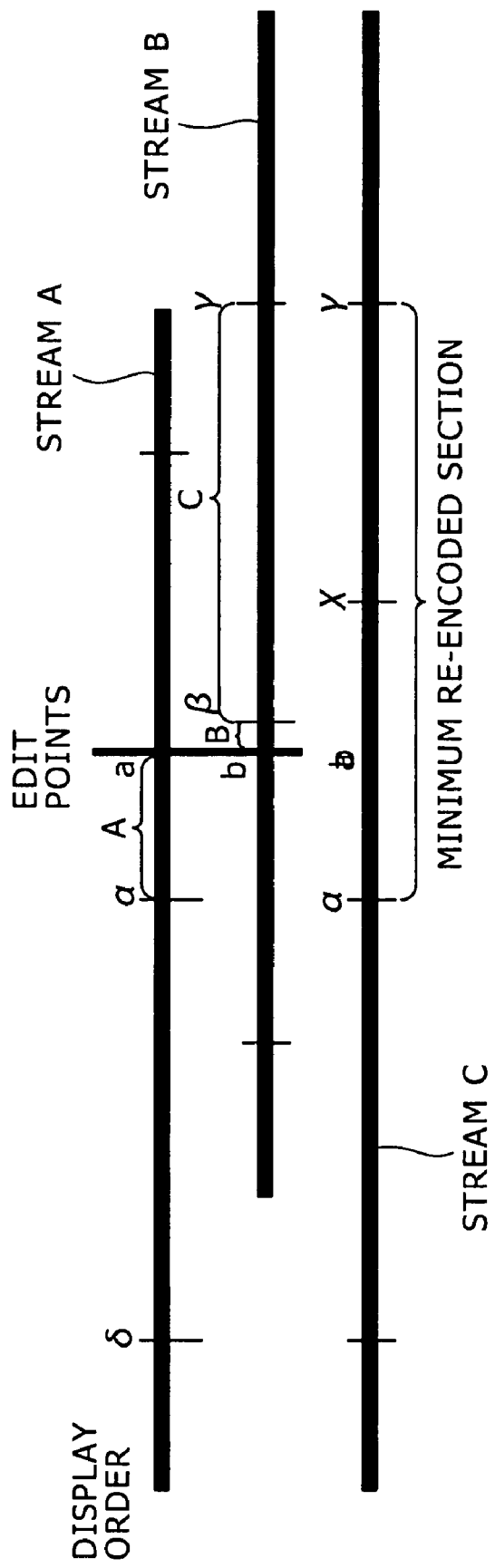
FIG. 5 is an explanatory diagram to be referred to in description of a process to set a minimum re-encoding section.

If the frame count (A+B) satisfies the relation 0≦(A+B)<N/2, where symbol A denotes the number of frames included in the reference re-encoded section between the start position α and the edit point a on the A-stream side, symbol B denotes the number of frames included in the reference re-encoded section between the edit point b and the end position β on the B-stream side and symbol N denotes the number of frames included in a GOP serving as a reference on these streams as described above, a section including a specific GOP including the edit point b on the stream B and a GOP immediately lagging behind the specific GOP as shown in FIG. 5 is taken as the minimum re-encoded section, which starts at the start position α on the stream A and ends at the end position γ of the immediately following GOP.

Let us assume that symbol C denotes the number of frames included in the immediately following GOP on the stream B. In this case, the relation N/2≦(A+B+C)≦N is examined in order to produce a result of determination as to whether or not the frame count (A+B+C) satisfies the relation. As described above, symbol A denotes the number of frames included in the reference re-encoded section between the start position α and the edit point a on the A-stream side whereas symbol B denotes the number of frames included in the reference re-encoded section between the edit point b and the end position β on the B-stream side. If the frame count (A+B+C) satisfies the relation N/2≦(A+B+C)≦N, the section starting at the start position α on the stream A and ending at the end position γ of the immediately following GOP on the stream B is regarded as one GOP and taken as the minimum re-encoded section. If the frame count (A+B+C) does not satisfy the relation N/2≦(A+B+C)≦N or, in other words, if the frame count (A+B+C) satisfies the relation N<(A+B+C), on the other hand, the section starting at the start position a on the stream A and ending at the end position γ of the immediately following GOP on the stream B is divided into a plurality of such GOPs that the relation N/2≦x≦N holds true where symbol x denotes the number of frames per GOP. The immediately following GOP on the stream B is a GOP immediately lagging behind the reference re-encoded section. Then, two or more GOPs are set and all the set GOPs are taken as the minimum re-encoded section.

It is desirable to divide the minimum re-encoded section into a plurality of GOPs in such a way that frames in the section are distributed to the GOPs as uniformly as possible. Let us assume for example that the minimum re-encoded section is divided into two GOPs and the value (A+B+C) represents the number of frames included in the section. In this case, if the number of frames included in the minimum re-encoded section is even, the number of frames included in the section is divided by two to result in a quotient to be used as the number of frames included in each of the GOPs. If the number of frames included in the minimum re-encoded section is odd, on the other hand, the minimum re-encoded section is divided into two GOPs in such a way that the time-wise later GOP includes one more frame than the time-wise earlier GOP. In either case, the two GOPs are taken as the minimum re-encoded section.

If the number of frames included in the minimum re-encoded section, which starts at the start position α on the stream A and ends at the end position γ of the immediately following GOP, is not a multiple of the number of GOPs obtained as a result of dividing the minimum re-encoded section, it is desirable to divide the minimum re-encoded section into a plurality of GOPs in such a way that, the time-wise later the GOP, the larger the number of frames included in the GOP. To put it concretely, let us assume for example that the number of frames included in the minimum re-encoded section starting at the start position α on the stream A and ending at the end position γ of the immediately following GOP is 19, and the minimum re-encoded section is divided into two GOPs. In this case, frames included in the minimum re-encoded section are distributed to the two GOPs in such a way that the time-wise earlier GOP includes nine frames while the time-wise later GOP includes 10 frames. This is because the minimum re-encoded section is decoded, linked at the edit points a and b and re-encoded before being joined to the unreencoded stream portion leading ahead of the start position α on the stream A and the unreencoded stream portion lagging behind the end position γ on the stream B. The unreencoded stream portion is a stream portion not re-encoded. In the joining process, VBV buffer occupancies of portions of the minimum re-encoded section and the stream portions not re-encoded are adjusted to agree with each other at the start position α on the stream A and the end position γ on the stream B. By assigning more frames to time-wise later GOPs, the degree of freedom in code assignment can be raised as will be described later.

Instead of dividing the minimum re-encoded section into a plurality of GOPs in such a way that (A+B+C) frames included in the section are distributed to the GOPs as uniformly as possible, the frame count (A+B+C) can also be divided by a frame count determined in advance to result in a value representing the number of aforementioned GOPs. In this case, the predetermined frame count is typically the smallest integer equal to or greater than N/2 where symbol N denotes the number of frames included in one GOP serving as a reference on the streams. For example, the minimum re-encoded section is divided into two GOPs in such a way that the time-wise earlier GOP includes frames, the number of which is equal to the predetermined frame count. In this case, a GOP may be split. As another example, it is desirable to set the predetermined frame count at x in the range N/2≦x≦N and the section starting at the start position α on the stream A and ending at the end position γ of the immediately following GOP on the stream B is divided into a plurality of GOPs each including x frames.

To put it concretely, let us assume for example that N=15 and the predetermined frame count is set at eight in a process of dividing the minimum re-encoded section into two GOPs. In this case, for (A+B+C)=16, the first resulting GOP includes eight frames and the second resulting GOP also includes eight frames as well. For (A+B+C)=17, the first resulting GOP includes eight frames and the second resulting GOP includes nine frames. For (A+B+C)=18, the first resulting GOP includes eight frames and the second resulting GOP includes 10 frames. As described above, the number of frames assigned to the second resulting GOP varies. By the same token, for (A+B+C)=22, the minimum re-encoded section can be divided into two such GOPs that the first resulting GOP includes eight frames and the second resulting GOP includes 14 frames.

Figure 6:
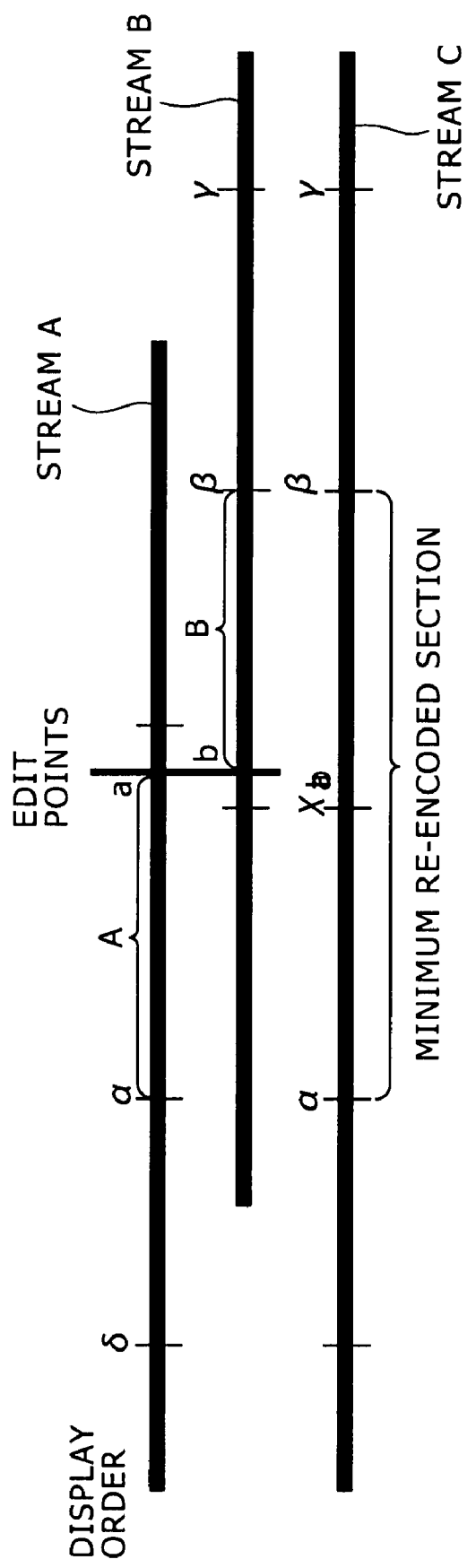
FIG. 6 is an explanatory diagram to be referred to in description of a process to set a minimum re-encoding section.

Let us assume that the reference re-encoded section, which starts at the start position α on the stream A and ends at the end position β on the stream B to include the edit points a and b, has (A+B) frames which satisfy the relation (N+1)≦(A+B)≦(2N−1) where symbol A denotes the number of frames included in the reference re-encoded section between the start position α and the edit point a on the A-stream side, symbol B denotes the number of frames included in the reference re-encoded section between the edit point b and the end position β on the B-stream side and symbol N denotes the number of frames included in one GOP serving as a reference on the streams. Let us also assume for example that the reference re-encoded section is divided into two GOPs as shown in FIG. 6. In this case, if the number of frames included in the reference re-encoded section is even, the number of frames included in the section is divided by two to result in a quotient to be used as the number of frames included in each of the GOPs and, if the number of frames included in the reference re-encoded section is odd, on the other hand, the section is divided into two GOPs in such a way that the time-wise later GOP includes one more frame than the time-wise earlier GOP. In either case, the two GOPs are taken as the minimum re-encoded section.

Also in this case, if the number of frames included in the reference re-encoded section, which starts at the start position α on the stream A and ends at the end position β on the stream B, is not a multiple of 2, it is desirable to divide the reference re-encoded section into a plurality of GOPs in such a way that, the time-wise later the GOP, the larger the number of frames included in the GOP.

Instead of dividing the minimum re-encoded section into a plurality of GOPs in such a way that (A+B) frames included in the section are distributed to the GOPs as uniformly as possible, in this case, the frame count (A+B) can also be divided by a frame count determined in advance to result in a value representing the number of aforementioned GOPs in the same way as the (A+B+C) frames are distributed to the GOPs as described above. The predetermined frame count is typically the smallest integer equal to or greater than N/2 where symbol N denotes the number of frames included in one GOP serving as a reference on the streams. For example, the reference recorded section is divided into two GOPs in such a way that the time-wise earlier GOP includes frames, the number of which is equal to the predetermined frame count. In this case, a GOP may be split.

Figure 7:
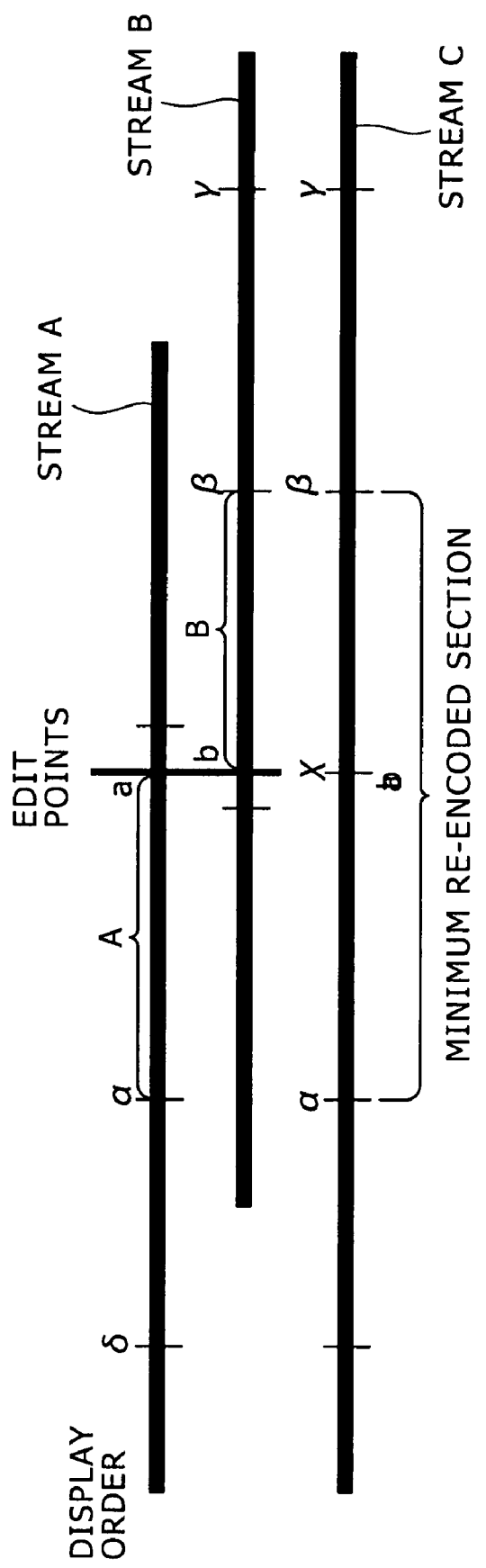
FIG. 7 is an explanatory diagram to be referred to in description of a process to set a minimum re-encoding section.

If the frame count (A+B) satisfies the relation (N+1)≦(A+B)≦(2N−1), the relation A≧N/2 is examined in order to produce a result of determination as to whether or not the relation A≧N/2 also holds true. If the result of the determination indicates that the relation A≧N/2 also holds true, the edit point b can be taken as a frame delimiter of a GOP as shown in FIG. 7. In this case, the head of a GOP portion lagging behind the edit point b taken as a frame delimiter can be set to coincide with an I2 picture of the GOP whereas B0 and B1 pictures can be omitted from the GOP.

As described above, a GOP is cut at an edit point, which is a portion exhibiting great changes of the picture, and the head of a GOP portion lagging behind the edit point in the direction of the display order is set to coincide with an I2 picture of the GOP whereas B0 and B1 pictures of the GOP are omitted. This process is desirable in that it is possible to suppress deteriorations of the picture quality of the GOP portion lagging behind the edit point.

If the frame count (A+B) satisfies the relation (N+1)≦(A+B)≦(2N−1), the relation A≧N/2 holds true and the frame count B representing the number of frames included in the GOP portion lagging behind the edit point b is small, that is, if the relation B≧N/2 does not hold true for example, a GOP (or GOPs) included in the stream B as a GOP (or GOPs) lagging behind the GOP portion lagging behind the edit point b is (are) added to the reference re-encoded frame to result in a minimum re-encoded section so that the number of frames included in the minimum re-encoded section is at least equal to a predetermined frame count such as N/2. In this way, it is possible to prevent the minimum re-encoded section from including GOPs having excessively few frames. This process is desirable in that it is possible to sustain continuity of VBV buffer occupancies in a GOP immediately lagging behind the edit point b and allocate an appropriate amount of generated code to each frame with ease.

If the frame count (A+B) satisfies the relation (N+1)≦(A+B)≦(2N−1) but the relation A≧N/2 does not hold true, the (A+B) frames can be assigned to two GOPs in such a way that the frames are distributed to the GOPs as uniformly as possible in the same way as that described above. As an alternative, a predetermined frame count is set at x in the range N/2≦x≦N and the (A+B) frames are assigned to the two GOPs in such a way that the frames are distributed to the GOPs each including x frames.

As described above, a minimum re-encoded section is determined in such a way that, as a result, the minimum re-encoded section does not include a too short GOP, which unnecessarily brings about deteriorations of the picture quality.

In addition, since a re-encoding process can be carried out on each GOP included in the minimum re-encoded section so as to prevent deteriorations of the picture quality from being brought about and provide as large a GOP length as possible for every GOP included in the re-encoded section, the encoding efficiency can be increased and a coding process to result in a high picture quality can be expected.

Then, the CPU 11 carries out a process for splicing. The process for splicing is a process to linking the streams A and B to each other at edit points a and b by sustaining continuity of VBV buffer occupancies of a VBV buffer model as it is in order to generate an output stream.

To put in detail, the CPU 11 supplies stream portions included in a minimum re-encoded section to the decoders. To be more specific, the CPU 11 supplies a portion ending at the edit point a on the stream A to the decoder 22 and a portion starting at the edit point B on the stream B to the decoder 23. If a frame required for a process to decode the portion starting at the edit point b leads ahead of the edit point b, the frame is also supplied to the decoder 23 as a part of the portion starting at the edit point b. Then, the CPU 11 issues a control command to the other CPU 20 by way of the north bridge 12, the PCI bus 14, the PCI bridge 17 and the control bus 19 to control the effect/switch 26 so that the effect/switch 26 links the outputs of the decoders 22 and 23 to each other at the edit points and, if necessary, carries out an effect process.

If a command is received to display the minimum re-encoded section and stream portions leading ahead of and lagging behind the section, the CPU 11 controls operations to supply specific compressed image data on the stream A and specific compressed image data on the stream B to the memory 18. The specific compressed image data on the stream A is data between a position requested as the display start and the edit point a on the stream A. On the other hand, the specific compressed image data on the stream B is data between the edit point b on the stream B and a position requested as the display end. If a frame required for a process to decode the portion starting at the edit point b on the stream B leads ahead of the edit point b, the frame is also included in the specific compressed image data on the stream B. Since the CPU 11 controls operations to supply such specific compressed image data to the memory 18, the other CPU 20 controls operations to supply the stream portion leading ahead of the minimum re-encoded section on the stream A from the memory 18 to the decoder 24 by way of the PCI bridge 17 and the stream splicer 25, supply the output of the decoder 24 to an external display apparatus or the like by way of the switch 29 and supply base band image data output by the effect/switch 26 as a result of an editing process to the external display apparatus or the like by way of the switch 29.

A typical method of splicing without losing continuity of VBV buffer occupancies of two streams each including any arbitrary frame to serve as an edit point is disclosed in Japanese Patent Laid-open No. 2006-67095.

In accordance with this method, however, if adjustment of the amount of code generated in a re-encoding process ends in a failure, the setting for the adjustment of the generated code amount should be changed and the re-encoding process should be carried out again. The adjustment of the amount of code generated in a re-encoding process is assumed to end in a failure for example if the VBV buffer occupancy of a B picture immediately leading ahead of a P picture becomes undesirably smaller than the VBV buffer occupancy of the P picture to be connected to the B picture so that the VBV buffer occupancies cannot be made continuous by adoption of a zero stuffing technique.

The so-called retry operation, which is defined as an operation to carry out a re-encoding process again, is complicated processing due to the fact that the retry operation includes operational coordination with a decoder. Thus, the retry operation is difficult to implement.

In order to solve the problem, if VBV buffer occupancies cannot be linked to each other during a splicing process, the editing apparatus 1 does not carry out the so-called retry operation in order to perform a re-encoding process again. Instead, the length of the minimum re-encoded section itself is increased to provide a longer section to be subjected to the re-encoding process. In this way, complicated operations need to be carried out only once. The complicated operations include operational coordination with an internal decoder, an internal encoder and a switcher, which are employed in the editing apparatus 1. An example of the switcher, which is used for carrying out a linking process, is the effect/switch 26 shown in FIG. 3. Thus, the processing carried out to solve the problem is easy to implement. In addition, it is desirable to carry out the processing in an application placing great emphasis on immediateness. An example of such an application is a case in which an edited image needs to be displayed in a real-time manner.

First of all, a re-encoding process is carried out on a minimum re-encoded section explained earlier by referring to FIGS. 4 to 6. Strictly speaking, the re-encoding process is a process including a decoding process followed by splicing and re-encoding processes. The CPU 11 reads out streams A and B from the HDD 16, supplying the streams to the memory 18 by way of the south bridge 15, the north bridge 12, the PCI bus 14 and the PCI bridge 17. Then, the CPU 11 executes control to supply pieces of data included in the streams A and B as pieces of data of the minimum re-encoded section to the decoders 22 and 23 respectively to get the data decoded thereby. The results of the decoding process are linked to each other by the effect/switch 26 and, if necessary, subjected to an effect process in the effect/switch 26. The output of the effect/switch 26 is supplied to the encoder 27.

The other CPU 20 takes the original VBV buffer occupancy of the beginning of the minimum re-encoded section as the start value of the VBV buffer occupancy of the re-encoding process. The beginning of the minimum re-encoded section is the beginning of a GOP including the edit point a on the stream A. In addition, the other CPU 20 takes the VBV buffer occupancy of the beginning of a GOP immediately lagging behind the minimum re-encoded section as a target value of the VBV buffer occupancy at the end of the re-encoding process. That is to say, as shown in FIG. 8, assuming that β is the end of the minimum re-encoded section, the VBV buffer occupancy of an I2 picture at the beginning of the next GOP is taken as a target value of the VBV buffer occupancy for the end position of the minimum re-encoded section. As shown in the figure, the I2 picture is denoted by symbol F.

Then, the other CPU 20 executes control to carry out a process to re-encode data of the minimum re-encoded section by adoption of any arbitrary method of adjusting the amount of code generated by the re-encoding process in such a way that the re-encoding process is ended at an actual VBV buffer occupancy greater than the target VBV buffer occupancy.

Then, at the end of the process to re-encode data of the minimum re-encoded section, if the actual VBV buffer occupancy is found greater than the target VBV buffer occupancy, the VBV buffer occupancies can be made contiguous by carrying out a zero stuffing process based on the zero stuffing technique. Upon completion of the zero stuffing process, the splicing operation is ended and a result of the re-encoding process can be obtained.

If the actual VBV buffer occupancy can be made greater than the target VBV buffer occupancy, then, a sequence of frames included in the next GOP as frames ending with a frame immediately leading ahead of the first P picture in the next GOP in the coding order is supplied to the stream splicer 25 and the decoder 23. In FIG. 8, the first P picture in the next GOP in the coding order is a P5 picture denoted by symbol G. In the decoder 23, the frames are decoded and a result of the decoding process is supplied to the encoder 27 by way of the effect/switch 26.

At that time, the VBV buffer occupancy of a picture denoted by symbol G in FIG. 8 as the first P picture in the next GOP in the coding order is taken as the target value, and the amount of code for the I picture denoted by symbol F in FIG. 8 is taken as the amount of code for the corresponding I picture on the original stream B. Then, by adoption of any arbitrary method of adjusting the amount of code generated by a re-encoding process, the re-encoding process is carried out on a sequence of frames starting with the head picture of the next GOP and ending with a frame immediately leading ahead of the picture denoted by symbol G in FIG. 8 as the first P picture in the next GOP in the coding order in such a way that the VBV buffer occupancies can be made continuous with the P picture, that is, the VBV buffer occupancy can be made greater than the target value. The frame immediately leading ahead of the picture denoted by symbol G in FIG. 8 is an IBB or IB picture.

As a result, if the VBV buffer occupancies can be made continuous at the target P picture by adoption of the zero stuffing technique if necessary, the other CPU 20 replaces the code of the I picture by the code of the corresponding I picture on the original stream B and takes the code as a portion of the result of the re-encoding process, ending the splicing operation.

If the VBV buffer occupancies cannot be made continuous at the target P picture, on the other hand, the other CPU 20 obtains a result of the re-encoding process carried out on the minimum re-encoded section ending at β shown in FIG. 8 and terminates the splicing operation. The result of the re-encoding process carried out on the minimum re-encoded section ending at β is the result of the re-encoding process that makes the VBV buffer occupancies at a frame delimiter of the GOP continuous. In other words, for a sequence of frames starting with a frame lagging behind β shown in FIG. 8 and ending with a frame immediately leading ahead of the first P picture in the coding order in the next GOP immediately lagging behind the minimum re-encoded section ending at β shown in the figure, as post-editing compressed image data, data of frames included in the original stream supplied to the stream splicer 25 is used in place of compressed image data obtained as a result of the re-encoding process. In the case of the example shown in FIG. 8, the sequence of frames starts with a frame denoted by symbol F and ending with a frame denoted by symbol G.

If the splicing operation can be ended, the other CPU 20 transmits a control signal to the CPU 11 to stop the process to supply streams to the decoder 22 and/or the decoder 23. If a command to display only the minimum re-encoded section is received, the CPU 11 stops the process to transfer the stream B to the memory 18. If a command to display portions leading ahead of the minimum re-encoded section and lagging behind the minimum re-encoded section is received, the CPU 11 continues the process to transfer the stream B to the memory 18. After a process to output base band image data of portions as a result of an editing process from the effect/switch 26 to an external display apparatus or the like by way of the switch 29, the other CPU 20 executes control to supply data of the portion included in the stream B as a portion lagging behind the minimum re-encoded section to the decoder 24 by way of the stream splicer 25 and output the data to the external display apparatus or the like by way of the switch 29.

If the VBF buffer occupancy is undesirably smaller than the target VBV buffer occupancy at the end of the re-encoding process carried out on the minimum re-encoded section, on the other hand, the VBV buffer occupancies cannot be made continuous by merely carrying out a zero stuffing process. Thus, the other CPU 20 controls every component to also re-encode the next GOP by adoption of any arbitrary method of adjusting the amount of code generated by the re-encoding process so that the VBV buffer occupancies can be made continuous.

To put it concretely, as shown in FIG. 9B, the other CPU 20 takes the next GOP as an extension of the minimum re-encoded section shown in FIG. 9A. Then, the other CPU 20 sets a target amount of generated code so as to terminate a re-encoding process for the extension of the minimum re-encoded section at a VBV buffer occupancy greater than the target VBV buffer occupancy by adoption of any arbitrary method of adjusting the amount of code generated by the re-encoding process. Subsequently, the other CPU 20 executes control to carry out the re-encoding process. The VBV buffer occupancy at γ shown in the figure as the start of the next GOP is taken as the target value of the VBV buffer occupancy at the end of the re-encoding process carried out on the extension of the minimum re-encoding process in case the minimum re-encoding process needs to be extended.

If the actual VBV buffer occupancy can be made greater than the target VBV buffer occupancy as a result of the re-encoding process carried out on data ending at γ shown in FIG. 9B, much like the case described above, the VBV buffer occupancy at the first P picture in the coding order of the further following GOP is taken as the target VBV buffer occupancy and a re-encoding process is then carried out. In FIG. 8, the first P picture in the coding order of the further following GOP is a picture denoted by symbol G. If the actual VBV buffer occupancy cannot be made greater than the target VBV buffer occupancy as a result of the re-encoding process carried out on data ending at γ shown in FIG. 9B, a further following GOP is again taken as another extension of the minimum re-encoded section.

It is to be noted that, in the next GOP immediately lagging behind the minimum re-encoded section or lagging behind an extension of the minimum re-encoded section, no B picture may lead ahead of the first P picture in the coding order. In this case, the other CPU 20 obtains a result of the re-encoding process carried out on the minimum re-encoded section and terminates the splicing operation. The result of the re-encoding process carried out on the minimum re-encoded section is the result of the re-encoding process that makes the VBV buffer occupancies at a frame delimiter of the GOP continuous. If the edit point a on the stream A is a GOP beginning in the display order of a GOP, the edit point b on the stream B can be taken as the beginning of the minimum re-encoded section.

That is to say, in the editing apparatus 1, if the VBV buffer occupancies cannot be adjusted to each other at a frame delimiter of the minimum re-encoded section, the minimum re-encoded section is extended to a frame delimiter of the next GOP to result in an extended re-encoded section. In this case, the frame delimiter of the minimum re-encoded section is the end of the minimum re-encoded section and the beginning of the next GOP. If the VBV buffer occupancies can be adjusted to each other at a frame delimiter of the minimum re-encoded section, on the other hand, for the I picture of the GOP immediately lagging behind the re-encoded section, the original code is used. In addition, a sequence of frames included in the GOP immediately lagging behind the re-encoded section as frames ending with the first P picture are re-encoded. Then, if the VBV buffer occupancies can be adjusted to each other at the P picture, the re-encoding process is terminated at a frame immediately leading ahead of the P picture. If the VBV buffer occupancies cannot be adjusted to each other at the P picture, on the other hand, the re-encoding process is terminated at the end of the minimum re-encoded section.

By carrying the operation in the editing apparatus 1 as described above, even if the actual VBV buffer occupancy cannot be made greater than the target VBV buffer occupancy in the minimum re-encoded section with a configuration including GOPs each including an edit point, a retry operation can be avoided. Thus, the implementation is easy in comparison with that including a retry operation.

Figure 10:
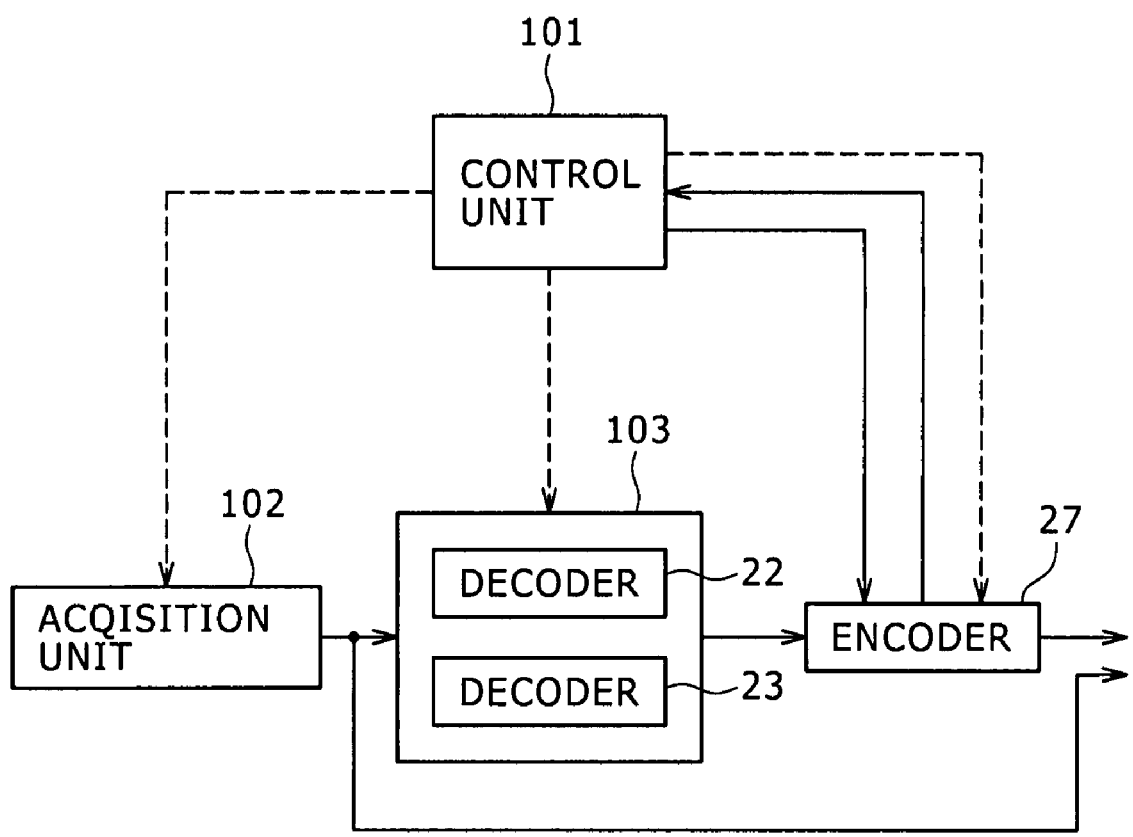
FIG. 10 is a functional block diagram showing the functional configuration of an editing apparatus.

FIG. 10 is a functional explanatory block diagram referred to in describing a main functional configuration of the editing apparatus 1 shown in FIG. 3. It is to be noted that, in FIG. 10, each element having a function identical with that of the counterpart shown in FIG. 3 is denoted by the same reference numeral as the counterpart.

As shown in FIG. 10, the editing apparatus 1 has a control unit 101, a data acquisition unit 102, a decoder unit 103, which includes the decoders 22 and 23, and the encoder 27.

The control unit 101 is a unit corresponding to the CPUs 11 and 20 for controlling the other units employed in the editing apparatus 1. In accordance with control executed by the control unit 101, the data acquisition unit 102 reads out compressed raw video data from the HDD 16 or the memory 18, and supplies a portion included in the data as a portion corresponding to the minimum re-encoded section to the decoder unit 103, which includes the decoders 22 and 23. It is also possible to provide a configuration including the HDD 16 and/or the memory 18, which are used for storing compressed raw video data, in the data acquisition unit 102. In addition, it is also possible to provide another configuration in which the data acquisition unit 102 acquires compressed raw video data from another apparatus connected to the editing apparatus 1. Moreover, if necessary, the data acquisition unit 102 also acquires a portion included in the compressed raw video data as a portion not corresponding to the minimum re-encoded section, links the acquired portion to the re-encoded portion and outputs the result of linking (to the stream splicer 25 shown in FIG. 3) in order to generate an edited image.

The decoder unit 103 is a unit for decoding compressed raw video data received from the data acquisition unit 102 and supplying a decompressed video signal obtained as a result of the decoding process to the encoder 27. It is to be noted that the editing apparatus 1 shown in FIG. 10 employs the two decoders 22 and 23 as decoding units for decoding decompressed raw video data. The decoder 24 described earlier is a decoding unit for decoding a stream obtained as a result of an editing process. However, the editing apparatus 1 may also employ one decoder or, conversely, the editing apparatus 1 may also have three or more decoders.

Figure 11:
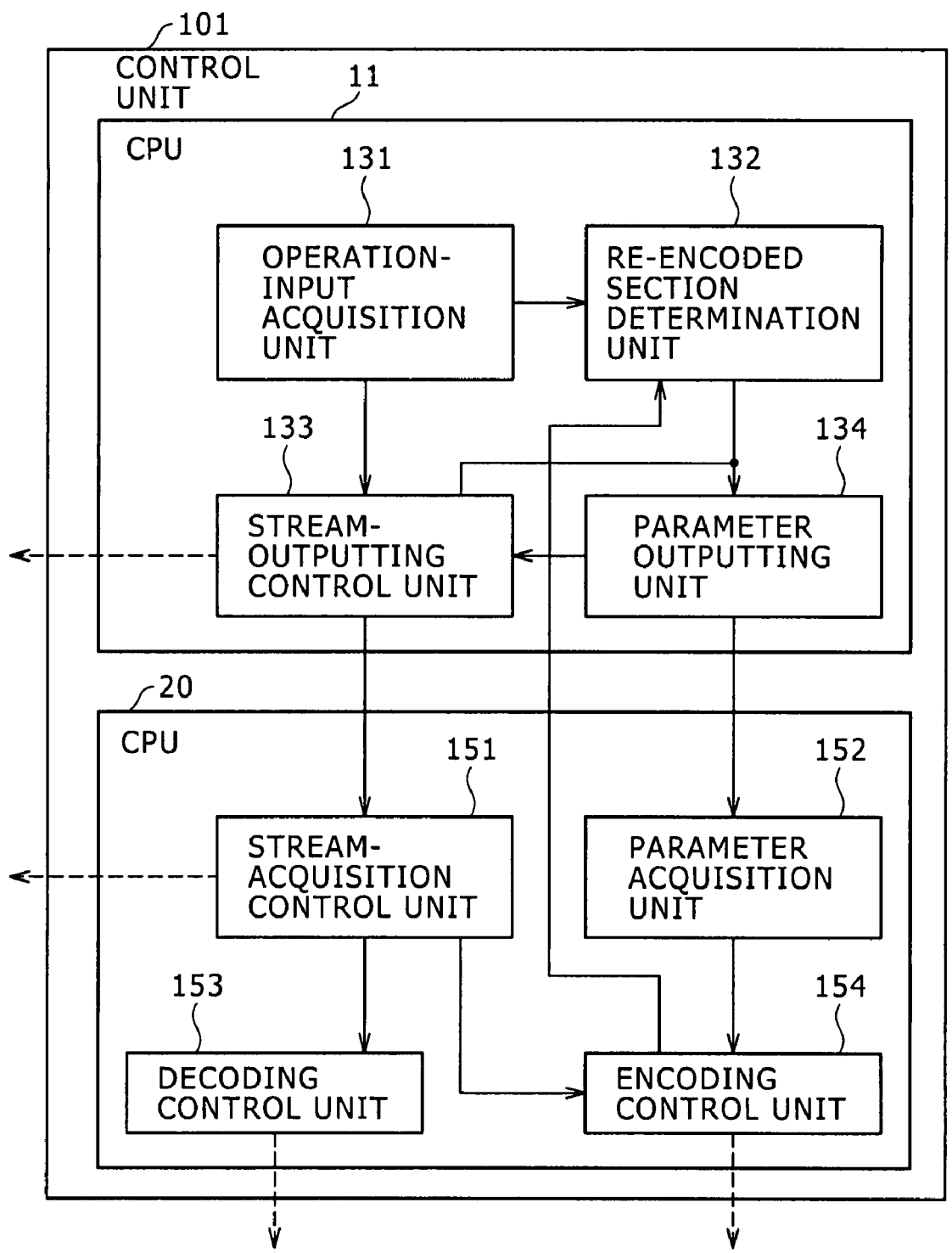
FIG. 11 is a functional block diagram showing the functional configuration of a control unit.

The control unit 101 has functions described in detail by referring to FIG. 11 as follows.

As shown in the figure, the control unit 101 is defined as a section having combined functions that can be executed by the CPUs 11 and 20. The CPU 11 has an operation-input acquisition unit 131, a re-encoded section determination unit 132, a stream-outputting control unit 133 and a parameter outputting unit 134. On the other hand, the other CPU 20 has a stream acquisition control unit 151, a parameter acquisition unit 152, a decoding control unit 153 and an encoding control unit 154.

The operation-input acquisition unit 131 is a unit for receiving an operation input entered by the user and acquiring information from the operation input. The acquired information includes information on streams to be edited and information on edit points each set on one of the streams. The operation-input acquisition unit 131 supplies the acquired information to the minimum re-encoded section determination unit 132 or the stream-outputting control unit 133.

First of all, the minimum re-encoded section determination unit 132 determines a minimum re-encoded section on the basis of the information on streams to be edited and information on edit points each set on one of the streams. Then, the minimum re-encoded section determination unit 132 supplies information on the minimum re-encoded section to the stream-outputting control unit 133 and the parameter outputting unit 134. If the minimum re-encoded section determination unit 132 does not receive a request to stop an operation to supply streams from the encoding control unit 154 or, in other words, if the minimum re-encoded section determination unit 132 receives a request to supply a next GOP to be set as an extension of the minimum re-encoded section from the encoding control unit 154, the minimum re-encoded section determination unit 132 supplies information on the extension of the minimum re-encoded section to the stream-outputting control unit 133 and the parameter outputting unit 134. The request to supply a next GOP to be set as an extension of the minimum re-encoded section is made because, as a result of a re-encoding process carried out on the minimum re-encoded section, the VBV buffer occupancy smaller than a target value is obtained.

The parameter outputting unit 134 is a unit for creating a variety of parameters on the basis information received from the minimum re-encoded section determination unit 132 and supplying the parameters to the stream acquisition unit 152. As described above, the information received from the minimum re-encoded section determination unit 132 is the information on the minimum re-encoded section and, if necessary, the information on the extension of the minimum re-encoded section.

On the basis of information received from the operation-input acquisition unit 131 and the minimum re-encoded section determination unit 132, the stream-outputting control unit 133 controls the data acquisition unit 102 to supply portions included in streams to be edited as portions determined to be a minimum re-encoded section to the decoder 22 or the decoder 23. In addition, if necessary, the stream-outputting control unit 133 also controls the data acquisition unit 102 to acquire portions included in streams to be edited as portions other than the minimum re-encoded section and supply the acquired portions to the stream splicer 25 shown in FIG. 3. On top of that, the stream-outputting control unit 133 outputs control signals to the stream acquisition control unit 151 as control signals for carrying out processing such as processes of editing streams, storing results of the process to edit the streams and displaying the editing results in accordance with information received from the operation-input acquisition unit 131.

The stream acquisition control unit 151 is a unit for controlling a process to acquire streams to be edited on the basis of a control signal received from the stream-outputting control unit 133.

The decoding control unit 153 is a unit for controlling a process to decode a stream. The stream acquisition unit 152 is a unit for receiving a variety of parameters required in a process to re-encode a stream from the parameter outputting unit 134 and supplying the parameters to the encoding control unit 154.

The encoding control unit 154 is a unit for controlling a process to re-encode an edited stream on the basis of parameters received from the stream acquisition unit 152.

Figure 12:
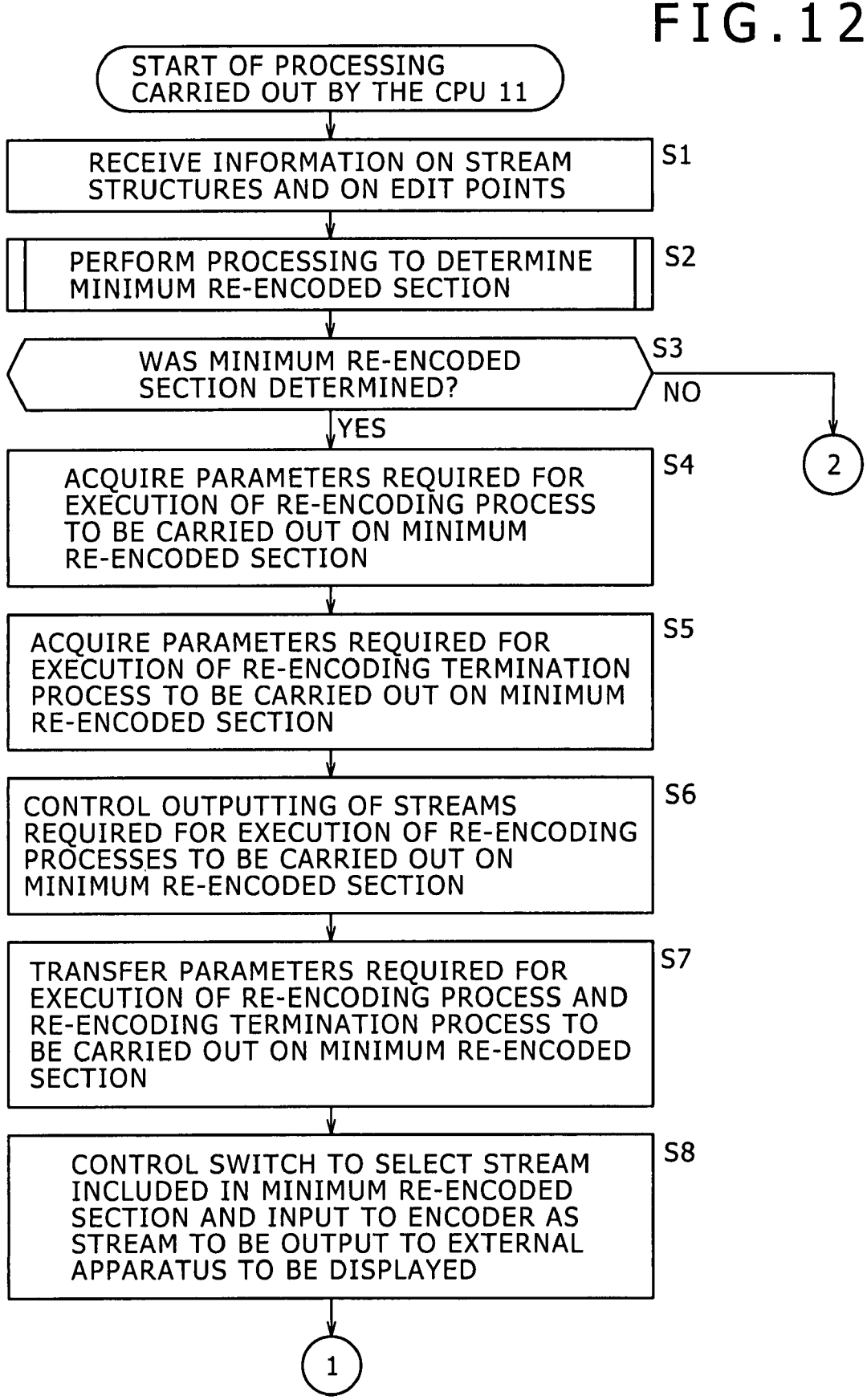
FIG. 12 shows a flowchart to be referred to in explanation of processing carried out by a CPU employed in the editing apparatus.
Figure 13:
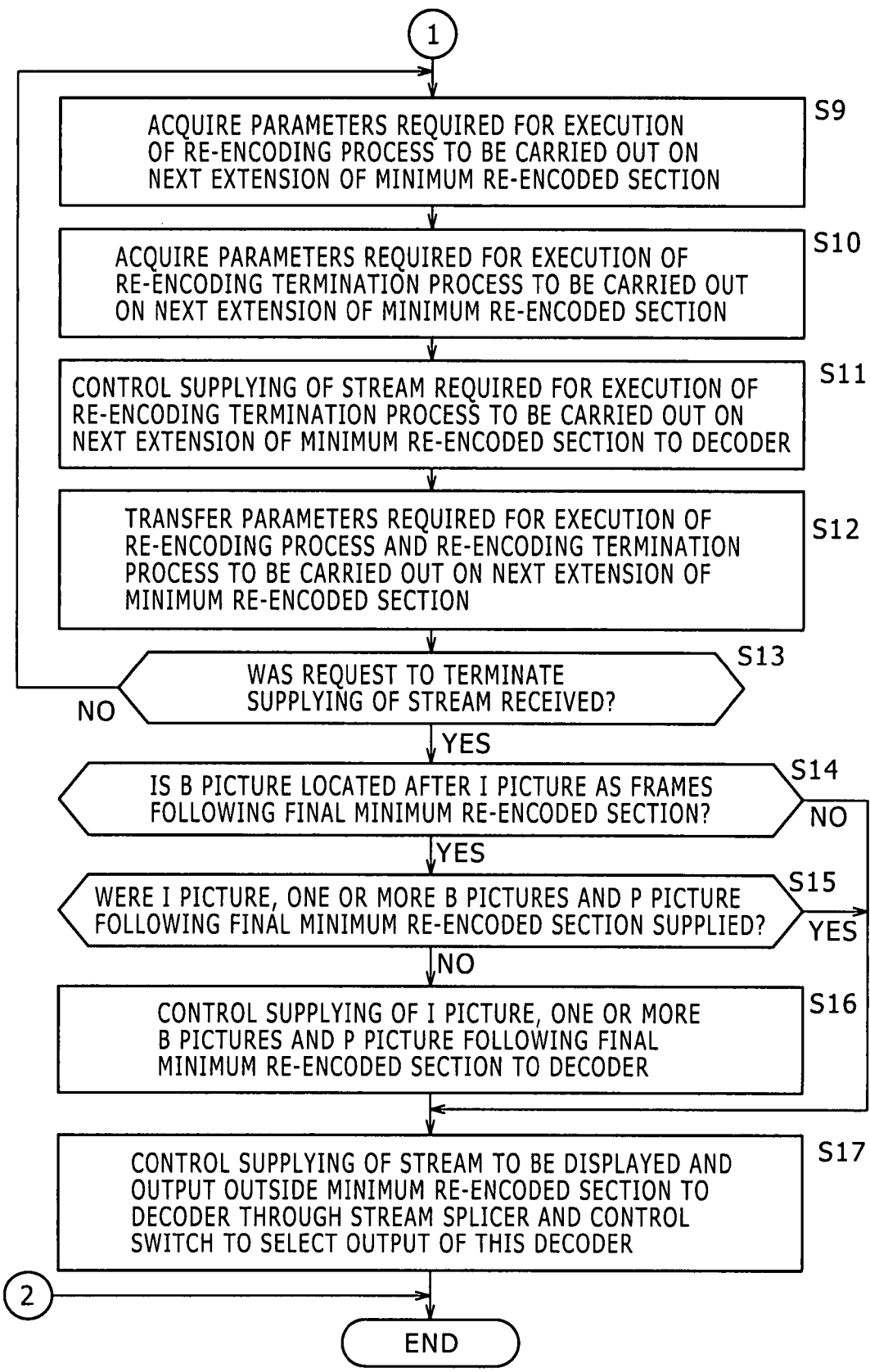
FIG. 13 shows the continuation of the flowchart shown in FIG. 12.

Next, processing carried out by the CPU 11 is explained by referring to a flowchart shown in FIGS. 12 and 13.

As shown in FIG. 12, the flowchart begins with a step S1 at which the CPU 11 receives an input representing the GOP structures of streams A and B and information on edit points on the streams respectively. The streams A and B are each compressed raw video data generated as a result of a compression/coding process. If a command to display a portions leading ahead of a reference re-encoded section and a portion lagging behind the reference re-encoded section has been received, the CPU 11 generates control signals for controlling a variety of units. The CPU 11 then supplies the control signals to the other CPU 20 by way of the north bridge 12, the PCI bus 14, the PCI bridge 17 and the control bus 19 as signals to supply data of the portion leading ahead of the reference re-encoded section on the stream A to the decoder 24 by way of the stream splicer 25 and output data generated by the decoder 24 to an external display apparatus or the like by way of the switch 29.

Then, at the next step S2, the CPU 11 carries out processing to determine a minimum re-encoded section as will be described later by referring to a flowchart shown in FIG. 14 or a flowchart shown in FIGS. 15 and 16. A minimum re-encoded section is determined as described earlier by referring to FIGS. 4 to 6.

Then, at the next step S3, the CPU 11 produces a result of determination as to whether or not a minimum re-encoded section has been determined successfully at the step S2. If the determination result produced at the step S3 indicates that a minimum re-encoded section has not been determined successfully at the step S2, the CPU 11 ends the processing represented by the flowchart shown in FIGS. 12 and 13.

If the determination result produced at the step S3 indicates that a minimum re-encoded section was not determined successfully at the step S2, on the other hand, the flow of the processing goes on to a step S4 at which the CPU 11 acquires parameters required for execution of a re-encoding process to be carried out on the minimum re-encoded section.

The parameters required for execution of a re-encoding process carried out on the minimum re-encoded section typically include the number of GOPs included in the stream A as a series of GOPs starting at the head of the stream A and ending with a GOP including an edit point on the stream A, information on the location of the GOPs, information on the position of the edit point on the stream A in the GOP including the edit point, the number of GOPs included in the stream B as a series of GOPs starting with a GOP including an edit point on the stream B and ending at the tail of the stream B, information on the position of the edit point on the stream B in the GOP including the edit point, the VBV value of the beginning of the minimum re-encoded section, the VBV value of the first frame of the next GOP immediately lagging behind the minimum re-encoded section and existence/non-existence of the effect or information on the type of the effect. The VBV value of the first frame of the next GOP immediately lagging behind the minimum re-encoded section is a VBV target value of the minimum re-encoded section.

Then, at the next step S5, the CPU 11 acquires parameters required for execution of a re-encoding termination process to be carried out on the minimum re-encoded section. As explained earlier by referring to FIG. 8, the re-encoding termination process is a re-encoding process carried out on a sequence of frames ending with the first P picture in the next GOP immediately lagging behind the minimum re-encoded section and a process to generate an edited stream C on the basis of a result of the re-encoding process carried out on the sequence of frames.

The parameters required for execution of a re-encoding termination process carried out on the minimum re-encoded section include the VBV target value in the GOP subjected to the re-encoding termination process, the VBV value in the first P picture of a GOP immediately lagging behind the GOP subjected to the re-encoding termination process, the amount of code for I pictures included in the GOP immediately lagging behind the GOP subjected to the re-encoding termination process, the numbers of B pictures leading ahead of the first P picture of a GOP immediately lagging behind the GOP subjected to the re-encoding termination process and a quantization matrix in a B picture immediately leading ahead of the first P picture of a GOP immediately lagging behind the GOP subjected to the re-encoding termination process.

Then, at the next step S6, the CPU 11 controls operations to output streams required for execution of re-encoding processes to be carried out on the minimum re-encoded section to the decoders 22 and 23. To put it concretely, the CPU 11 supplies a portion included in the stream A as a portion ending with the edit point a to the decoder 22 as a stream portion required in a re-encoding process to be carried out on the minimum re-encoded section. By the same token, the CPU 11 supplies a portion included in the stream B as a portion starting with the edit point b to the decoder 23 as another stream portion required in a re-encoding process to be carried out on the minimum re-encoded section. Then, the CPU 11 generates control signals for a variety of units. The CPU 11 outputs the generated control signals to the other CPU 20 by way of the north bridge 12, the PCI bus 14, the PCI bridge 17 and the control bus 19 as signals for driving the effect/switch 26 to link a result produced by the decoder 22 to a result produced by the decoder 23 at the edit points a and b and, if necessary, carry out an effect process.

Then, at the next step S7, the CPU 11 transfers the parameters required for execution of a re-encoding process to be carried out on the minimum re-encoded section and the parameters required for execution of a re-encoding termination process to be carried out on the minimum re-encoded section to the other CPU 20 by way of the north bridge 12, the PCI bus 14, the PCI bridge 17 and the control bus 19.

Then, at the next step S8, the CPU 11 outputs a control signal to the other CPU 20 by way of the north bridge 12, the PCI bus 14, the PCI bridge 17 and the control bus 19 as a signal for controlling the switch 29 to select a stream included in the minimum re-encoded section and input to the encoder 27.

Then, at the next step S9, the CPU 11 acquires parameters required for execution of a re-encoding process to be carried out on the next extension of the minimum re-encoded section.

Subsequently, at the next step S10, the CPU 11 acquires parameters required for execution of a re-encoding termination process to be carried out on the next extension of the minimum re-encoded section.

Then, at the next step S11, the CPU 11 controls an operation to supply a stream required for execution of a re-encoding termination process to be carried out on the next extension of the minimum re-encoded section to the decoder 23. The stream required for execution of a re-encoding termination process to be carried out on the next extension of the minimum re-encoded section is a GOP included in the stream B as a GOP immediately lagging behind the minimum re-encoded section.

Then, at the next step S12, the CPU 11 transfers the parameters required for execution of a re-encoding process to be carried out on the next extension of the minimum re-encoded section and the parameters required for execution of a re-encoding termination process to be carried out on the next extension of the minimum re-encoded section to the other CPU 20 by way of the north bridge 12, the PCI bus 14, the PCI bridge 17 and the control bus 19.

Then, at the next step S13, the CPU 11 produces a result of determination as to whether or not a request to terminate an operation to supply a stream to the decoder 23 has been received from the other CPU 20 through the control bus 19, the PCI bridge 17, the PCI bus 14 and the north bridge 12.

The other CPU 20 issues a request to the CPU 11 to terminate an operation to supply a stream to the decoder 23 when a re-encoding process carried out on the minimum re-encoded section is ended at a VBV buffer occupancy greater than the target value of the VBV buffer occupancy.

If the determination result produced at the step S13 indicates that a request to terminate an operation to supply a stream to the decoder 23 has not been received from the other CPU 20, that is, if a re-encoding process carried out on the minimum re-encoded section has not been ended at a VBV buffer occupancy greater than the target value of the VBV buffer occupancy, the flow of the processing goes back to the step S9.

If the determination result produced at the step S13 indicates that a request to terminate an operation to supply a stream to the decoder 23 has been received from the other CPU 20, on the other hand, the flow of the processing goes on to a step S14 at which the CPU 11 produces a result of determination as to whether or not, frames immediately lagging behind the final minimum re-encoded section include a B picture located right after an I picture. If the determination result produced at the step S14 indicates that a B picture is not located right after an I picture, that is, if a P picture is located right after an I picture, the flow of the processing goes on to a step S17 to be described later.

If the determination result produced at the step S14 indicates a B picture is located right after an I picture, on the other hand, the flow of the processing goes on to a step S15 at which the CPU 11 produces a result of determination as to whether or not an I picture, one or more B pictures and a P picture, which lag behind the final minimum re-encoded section, have been read out from the HDD 16 and supplied to the memory 18 by way of the south bridge 15, the north bridge 12, the PCI bus 14 and the PCI bridge 17. To put it concretely, the I picture, the one or more B pictures and the P picture are a plurality of frames starting with a frame denoted by symbol F in FIG. 8 and ending with a frame denoted by symbol G in the same figure. At the step S15, the CPU 11 produces a result of determination as to whether or not these pictures have been read out from the HDD 16 and supplied to the memory 18 by way of the south bridge 15, the north bridge 12, the PCI bus 14 and the PCI bridge 17. If the determination result produced at the step S15 indicates that the I picture, the one or more B pictures and the P picture have been read out from the HDD 16 and supplied to the memory 18, the flow of the processing goes on to the step S17 to be described later.

If the determination result produced at the step S15 indicates that the I picture, the one or more B pictures and the P picture have not been supplied to the memory 18, on the other hand, the flow of the processing goes on to a step S16 at which the CPU 11 controls an operation to supply an I picture, one or more B pictures and a P picture, which lag behind the final minimum re-encoded section, to the decoder 23.

If the determination result produced at the step S14 indicates that a B picture is not located right after an I picture, that is, if a P picture is located right after an I picture, if the determination result produced at the step S15 indicates that the I picture, the one or more B pictures and the P picture have been read out from the HDD 16 and supplied to the memory 18 or after the process carried out at the step S16 has been completed, the flow of the processing goes on to the step S17 at which the CPU 11 generates control signals for a variety of units. The CPU 11 then outputs the generated control signals to the other CPU 20 by way of the north bridge 12, the PCI bus 14, the PCI bridge 17 and the control bus 19 as signals for supplying streams to be displayed and output outside the minimum re-encoded section to the decoder 24 for decoding the streams by way of the stream splicer 25 and controlling a variety of units to supply the output of the decoder 24 to an external display apparatus or the like. Finally, the CPU 11 terminates the processing represented by the flowchart shown in FIGS. 12 and 13.

In the processing described above, the CPU 11 is capable of determining a minimum re-encoded section and supplying parameters required in a re-encoding process to be carried out on the minimum re-encoded section and a re-encoding termination process to be carried out on the minimum re-encoded section to the other CPU 20 by way of the north bridge 12, the PCI bus 14, the PCI bridge 17 and the control bus 19. In addition, the CPU 11 is also capable of controlling operations to supply streams of the minimum re-encoded section to the memory 18 as well as the decoder 23 (or the decoder 22 if necessary) by way of the north bridge 12, the PCI bus 14 and the PCI bridge 17.

In addition, the CPU 11 is capable of supplying parameters required in a re-encoding process to be carried out on an extension of the minimum re-encoded section and a re-encoding termination process to be carried out on the extension to the other CPU 20 by way of the north bridge 12, the PCI bus 14, the PCI bridge 17 and the control bus 19 if the minimum re-encoded section is extended. On top of that, the CPU 11 is also capable of controlling operations to supply streams of the extension of the minimum re-encoded section to the memory 18 as well as the decoder 23 (or the decoder 22 if necessary) by way of the north bridge 12, the PCI bus 14 and the PCI bridge 17. Thus, even if the minimum re-encoded section is extended to result in an extended minimum re-encoded section, the editing apparatus 1 is capable of reproducing and outputting an edited image continuously because the processes for the extension of the minimum re-encoded section can be carried out without a delay or the processes for the extended minimum re-encoded section is not suspended.

Figure 14:
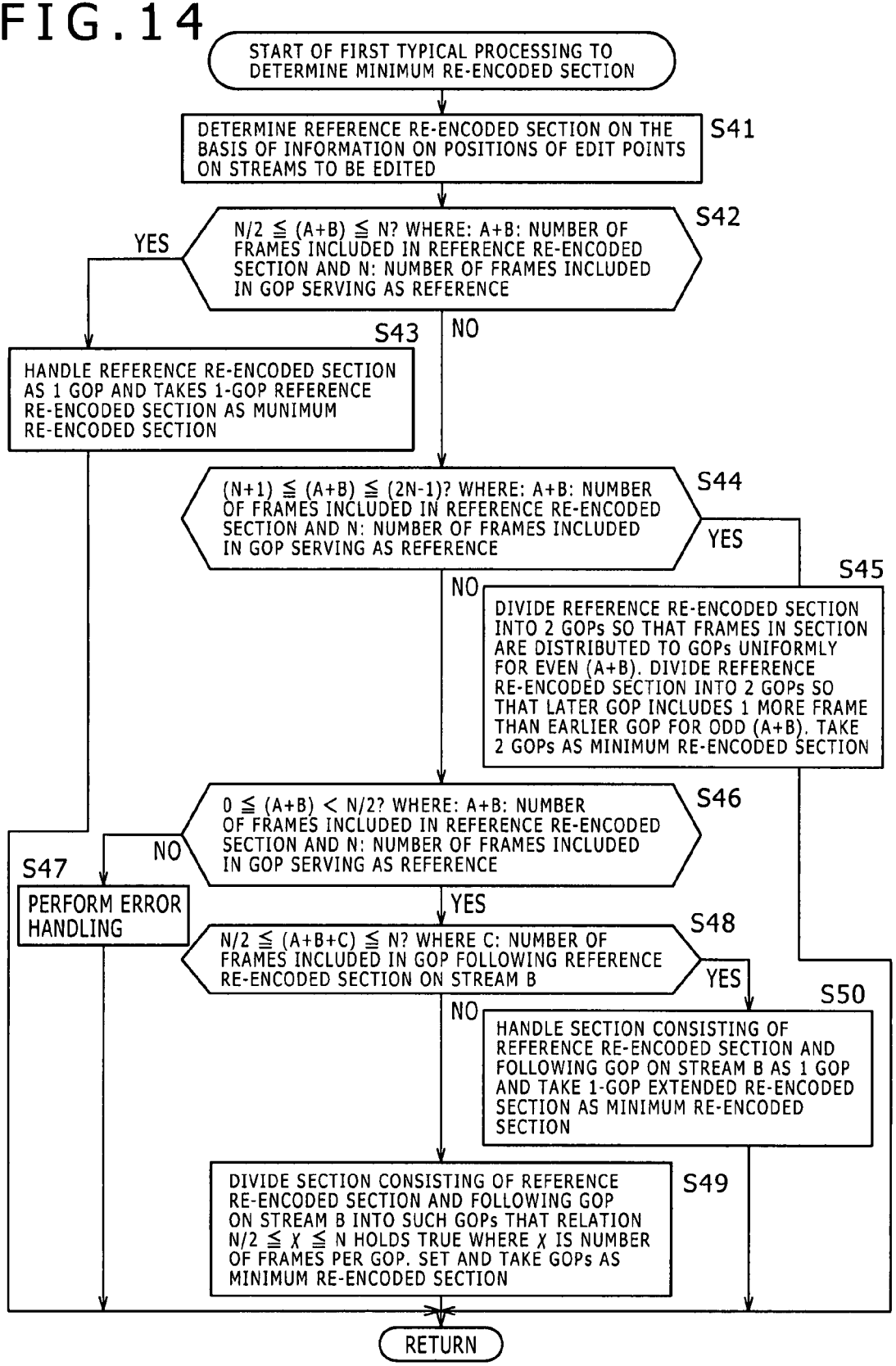
FIG. 14 shows a flowchart to be referred to in explanation of first typical processing to determine minimum re-encoding section.

By referring to a flowchart shown in FIG. 14, the following description explains minimum re-encoded section determination processing 1, which is a first example of the processing carried out at the step S2 of the flowchart shown in FIG. 12 to determine a minimum re-encoded section.

As shown in FIG. 14, the flowchart begins with a step S41 at which the CPU 11 determines a reference re-encoded section of streams to be edited as described earlier by referring to FIG. 4 on the basis of information on the positions of edit points on the streams. That is to say, the CPU 11 takes a section starting at α, ending at β and including edit points a and b as a reference re-encoded section on a stream C obtained as a result of linking of the streams A and B at the edit points a and b set on the streams A and B respectively. In this case, symbol α denotes the start position of a GOP included in the stream A as a GOP including the edit point a whereas symbol β denotes the end position of a GOP included in the stream B as a GOP including the edit point b.

Then, at the next step S42, the CPU 11 produces a result of determination as to whether or not the frame count (A+B) satisfies the relation N/2≦(A+B)≦N where symbol N denotes the number of frames included in a GOP serving as a reference on the streams.

If the determination result produced at the step S42 indicates that the frame count (A+B) satisfies the relation N/2≦(A+B)≦N, the flow of the processing goes on to a step S43 at which the CPU 11 handles the reference re-encoded section as one GOP and takes the 1-GOP reference re-encoded section as a minimum re-encoded section. Then, the flow of the processing goes back to the step S3 following the step S2 of the flowchart shown in FIG. 12.

If the determination result produced at the step S42 indicates that the frame count (A+B) does not satisfy the relation N/2≦(A+B)≦N, on the other hand, the flow of the processing goes on to a step S44 at which the CPU 11 produces a result of determination as to whether or not the frame count (A+B) satisfies the relation (N+1)≦(A+B)≦(2N−1).

If the determination result produced at the step S44 indicates that the frame count (A+B) satisfies the relation (N+1)≦(A+B)≦(2N−1), the flow of the processing goes on to a step S45 at which the CPU 11 divides the reference re-encoded section into two GOPs in such a way that frames in the section are distributed to the GOPs as uniformly as possible as described earlier by referring to FIG. 6. To put it in detail, if the number of frames included in the reference re-encoded section is even, the number of frames included in the section is divided by two to result in a quotient to be used as the number of frames included in each of the GOPs and, if the number of frames included in the reference re-encoded section is odd, on the other hand, the section is divided into two GOPs in such a way that the time-wise later GOP includes one more frame than the time-wise earlier GOP does. In either case, the two GOPs are taken as the minimum re-encoded section.

In this case, if the frame count (A+B) representing the number of frames included in the reference re-encoded section is not a multiple of 2, it is desirable to divide the reference re-encoded section into two GOPs in such a way that, the time-wise later GOP has more frames than the time-wise earlier GOP. This is because the minimum re-encoded section is decoded, linked at the edit points a and b and re-encoded before being joined to the unreencoded stream portion leading ahead of the start position α on the stream A and the unreencoded stream portion lagging behind the end position β on the stream B. An unreencoded stream portion is a portion not re-encoded. In the joining process, VBV buffer occupancies of portions of the re-encoded stream and the stream not re-encoded are adjusted to agree with each other at the start position α on the stream A and the end position β on the stream B. By assigning more frames to a time-wise later GOP, the degree of freedom in code assignment can be raised.

If the determination result produced at the step S44 indicates that the frame count (A+B) does not satisfy the relation (N+1)≦(A+B)≦(2N−1), on the other hand, the flow of the processing goes on to a step S46 at which the CPU 11 produces a result of determination as to whether or not the frame count (A+B) satisfies the relation 0≦(A+B)<N/2.

If the determination result produced at the step S46 indicates that the frame count (A+B) does not satisfy the relation 0≦(A+B)<N/2, the flow of the processing goes on to a step S47 at which the CPU 11 carries out an error handling process. This is because the determination result implies that the frame count (A+B) has a value at least equal to 2N. Then, the flow of the processing goes back to the step S3 following the step S2 of the flowchart shown in FIG. 12.

If the determination result produced at the step S46 indicates that the frame count (A+B) satisfies the relation 0≦(A+B)<N/2, on the other hand, the flow of the processing goes on to a step S48 at which the CPU 11 produces a result of determination as to whether or not the frame count (A+B+C)

satisfies the relation $N/2 \leq (A+B+C) \leq N$ where symbol C denotes the number of frames included in a GOP immediately lagging behind the reference re-encoded section on the stream B.

If the determination result produced at the step S48 indicates that the frame count (A+B+C) does not satisfy the relation $N/2 \leq (A+B+C) \leq N$, that is, if the frame count (A+B+C) satisfies the relation $N<(A+B+C)$, the flow of the processing goes on to a step S49 at which the CPU 11 divides the section starting at the start position α on the stream A and ending at the end position γ of the immediately following GOP on the stream B into a plurality of such GOPs that the relation $N/2 \leq x \leq N$ holds true where symbol x denotes the number of frames per GOP as explained earlier by referring to FIG. 5. Then, two or more GOPs are set and all the set GOPs are taken as the minimum re-encoded section. The immediately following GOP on the stream B is a GOP immediately lagging behind the reference re-encoded section. It is desirable to divide the minimum re-encoded section into a plurality of GOPs in such a way that frames in the section are distributed to the GOPs as uniformly as possible. Let us assume for example that the minimum re-encoded section is divided into two GOPs and the value (A+B+C) represents the number of frames included in the section. In this case, if the number of frames included in the minimum re-encoded section is even, the number of frames included in the section is divided by two to result in a quotient to be used as the number of frames included in each of the GOPs. If the number of frames included in the minimum re-encoded section is odd, on the other hand, the minimum re-encoded section is divided into two GOPs in such a way that the time-wise later GOP includes one more frame than the time-wise earlier GOP. In either case, the two GOPs are taken as the minimum re-encoded section.

If the frame count (A+B+C) representing the number of frames included in the minimum re-encoded section, which starts at the start position α on the stream A and ends at the end position γ of the immediately following GOP, is not a multiple of the number of GOPs obtained as a result of dividing the minimum re-encoded section, it is desirable to divide the minimum re-encoded section into a plurality of GOPs in such a way that, the time-wise later the GOP, the larger the number of frames included in the GOP. This is because, as explained earlier, the minimum re-encoded section is decoded, linked at the edit points a and b and re-encoded before being joined to the unreencoded stream portion preceding the start position α on the stream A and the unreencoded stream portion lagging behind the end position γ on the stream B. An unreencoded stream portion is a portion not re-encoded. In the joining process, VBV buffer occupancies of portions of the re-encoded stream and the stream not re-encoded are adjusted to agree with each other at the start position α on the stream A and the end position γ on the stream B. By assigning more frames to a time-wise later GOP, the degree of freedom in code assignment can be raised.

Instead of dividing the minimum re-encoded section into a plurality of GOPs in such a way that (A+B+C) frames included in the section are distributed to the GOPs as uniformly as possible, the (A+B+C) frames can also be divided by a frame count determined in advance to result in GOPs. In this case, the predetermined frame count is typically the smallest integer equal to or greater than N/2 where symbol N denotes the number of frames included in one GOP serving as a reference on the streams. For example, the minimum recorded section is divided into two GOPs in such a way that the time-wise earlier GOP includes frames, the number of which is equal to the predetermined frame count. In this case, a GOP may be split. As another example, it is desirable to set the predetermined frame count at x in the range $N/2 \leq x \leq N$ and the section starting at the start position α on the stream A and ending at the end position γ of the immediately following GOP on the stream B is divided into a plurality of such GOPs that each of the GOPs includes x frames.

After the process carried out at the step S49 has been completed, the flow of the processing goes back to the step S3 following the step S2 of the flowchart shown in FIG. 12.

If the determination result produced at the step S48 indicates that the frame count (A+B+C) satisfies the relation $N/2 \leq (A+B+C) \leq N$, on the other hand, the flow of the processing goes on to a step S50 at which the CPU 11 handles the extended re-encoded section as one GOP and takes the 1-GOP extended re-encoded section as a minimum re-encoded section. The 1-GOP extended re-encoded section consists of the reference re-encoded section and a GOP included in the stream B as a GOP immediately lagging behind the reference re-encoded section. Then, the flow of the processing goes back to the step S3 following the step S2 of the flowchart shown in FIG. 12.

As a result of the processing carried out to determine a minimum re-encoded section as described above, it is possible to prevent the section from including a short GOP, which unnecessarily brings about deteriorations of the picture quality. In addition, the re-encoding process is carried out so as to produce as large a GOP length as possible for every GOP included in the minimum re-encoded section. Thus, the encoding efficiency can be increased and a coding process to result in a high picture quality can be expected.

It is to be noted that, in the process carried out at the step S45, the CPU 11 divides the reference re-encoded section into two GOPs in such a way that frames in the section are distributed to the GOPs as uniformly as possible.

Instead of dividing the minimum re-encoded section into a plurality of GOPs in such a way that (A+B+C) frames included in the section are distributed to the GOPs as uniformly as possible, the (A+B+C) frames can also be divided by a frame count determined in advance to result in GOPs.

Figure 15:
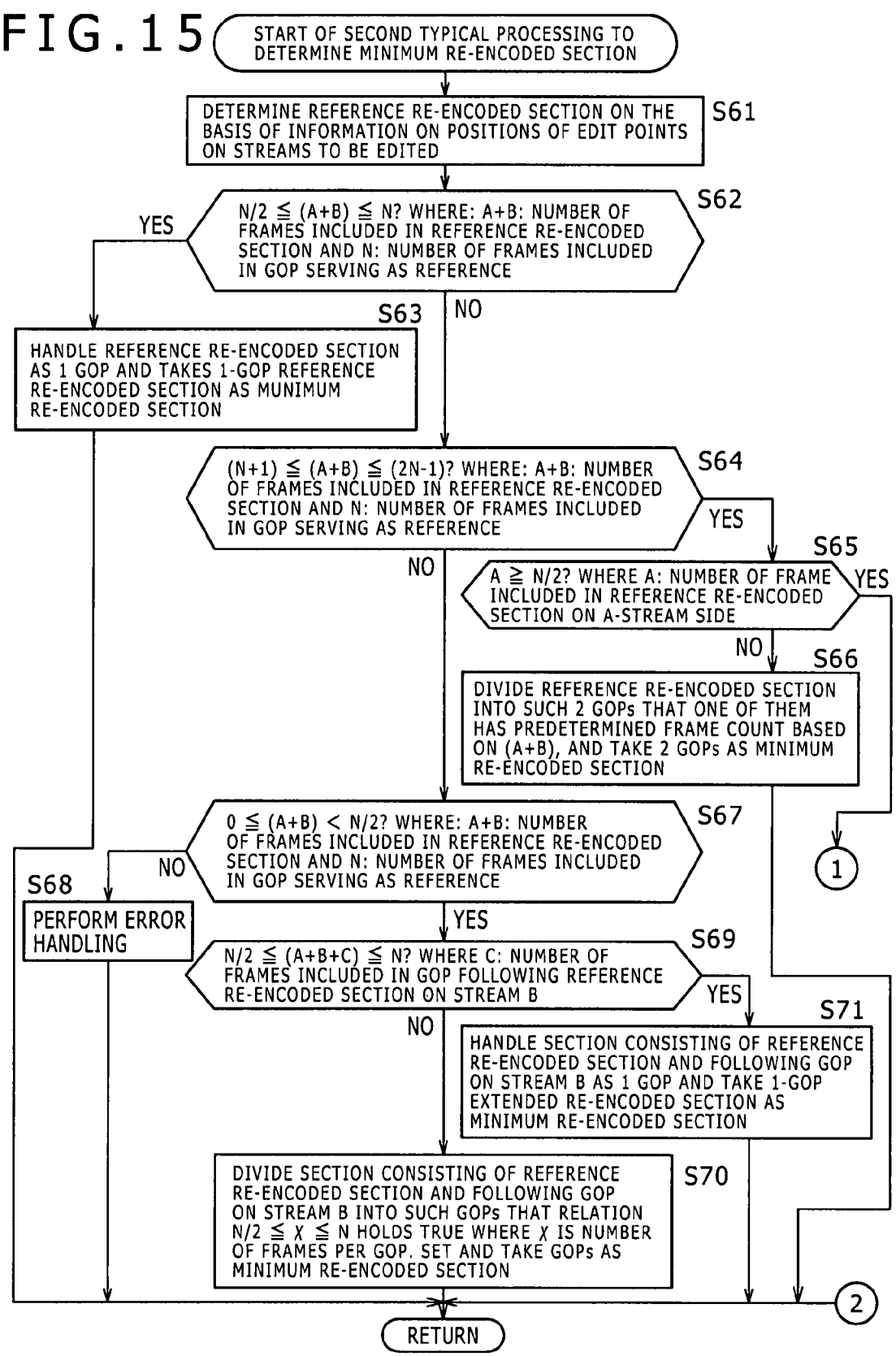
FIG. 15 shows a flowchart to be referred to in explanation of second typical processing to determine minimum re-encoding section.
Figure 16:
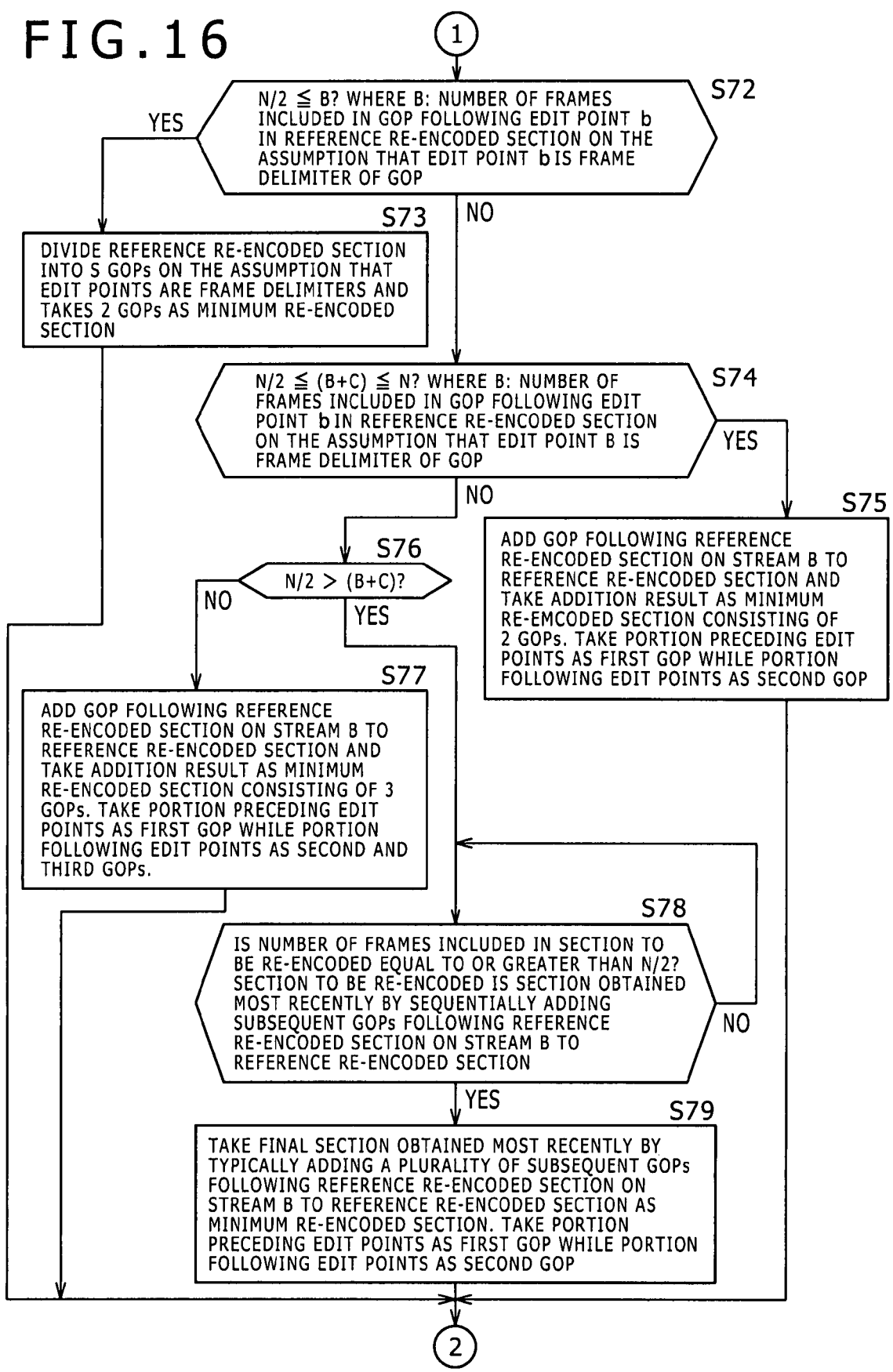
FIG. 16 shows the continuation of the flowchart shown in FIG. 15.

By referring to a flowchart shown in FIGS. 15 and 16, the following description explains minimum re-encoded section determination processing 2, which is a second example of the processing carried out at the step S2 of the flowchart shown in FIG. 12 to determine a minimum re-encoded section.

Processes carried out at steps S61 to S64 of the flowchart shown in FIG. 15 are basically the same as those carried out at the steps S41 to S44 of the flowchart shown in FIG. 14.

In a few words, the CPU 11 determines a reference re-encoded section as described earlier by referring to FIG. 4 on the basis of information on the positions of edit points each set on one of streams to be edited. Then, if the frame count (A+B) satisfies the relation $N/2 \leq (A+B) \leq N$, the CPU 11 handles the reference re-encoded section as one GOP and takes the 1-GOP reference re-encoded section as a minimum re-encoded section.

If the frame count (A+B) does not satisfy the relation $N/2 \leq (A+B) \leq N$, on the other hand, the flow of the processing goes on to a step S64 at which the CPU 11 produces a result of determination as to whether or not the frame count (A+B) satisfies the relation $(N+1) \leq (A+B) \leq (2N-1)$. If the determination result produced at the step S64 indicates that the frame count (A+B) does not satisfy the relation $(N+1) \leq (A+B) \leq (2N-1)$, the flow of the processing goes on to a step S67 to be described later.

If the determination result produced at the step S64 indicates that the frame count (A+B) satisfies the relation $(N+1) \leq (A+B) \leq (2N-1)$, on the other hand, the flow of the processing goes on to a step S65 at which the CPU 11 produces a result of determination as to whether or not the relation A≧N/2 holds true. If the determination result produced at the step S65 indicates that the relation A≧N/2 holds true, the flow of the processing goes on to a step S72 to be described later by referring to the flowchart shown in FIG. 16.

If the determination result produced at the step S65 indicates that the relation A≧N/2 does not hold true, on the other hand, the flow of the processing goes on to a step S66 at which the CPU 11 divides the reference re-encoded section into such two GOPs that one of them has a predetermined frame count based on the value of the frame count (A+B), and takes the reference re-encoded section as a minimum re-encoded section. Then, the flow of the processing goes back to the step S3 following the step S2 of the flowchart shown in FIG. 12.

For example, the CPU 11 divides the reference re-encoded section into such two GOPs that the number of frames included in the time-wise earlier one of the two GOPs is typically equal to a predetermined frame count, which is typically the smallest integer equal to or greater than N/2. In this case, a GOP may be split. To put it concretely, let us assume for example that N=15 and the predetermined frame count is eight in a process of dividing the minimum re-encoded section into two GOPs. In this case, for (A+B+C)=16, the first resulting GOP includes eight frames and the second resulting GOP also includes eight frames as well. For (A+B+C)=17, the first resulting GOP includes eight frames and the second resulting GOP includes nine frames. For (A+B+C)=18, the first resulting GOP includes eight frames and the second resulting GOP includes 10 frames. As described above, the number of frames assigned to the second resulting GOP varies. By the same token, for (A+B+C)=22, the minimum re-encoded section can be divided into two such GOPs that the first resulting GOP includes eight frames and the second resulting GOP includes 14 frames.

In this way, the number of frames included in the time-wise earlier GOP is set at such a predetermined frame count while the number of frames included in the time-wise later GOP is set at such a large value that the re-encoding process is not difficult to carried out. This frame assignment technique is desirable in that, by assigning a large number of frames to the time-wise later GOP, the degree of freedom in code assignment can be raised in decoding and re-encoding processes for adjusting VBV buffer occupancies of contending portions in the re-encoded stream and the stream not re-encoded.

If the determination result produced at the step S64 indicates that the frame count (A+B) does not satisfy the relation (N+1)≦(A+B)≦(2N−1), the CPU 11 carries out processes at steps S67 to S71, which are basically the same as the steps S46 to S50 of the flowchart shown in FIG. 14.

In a few words, the CPU 11 produces a result of determination as to whether or not the frame count (A+B) satisfies the relation 0≦(A+B)<N/2. If the frame count (A+B) does not satisfy the relation 0≦(A+B)<N/2, the CPU 11 carries out an error handling process. This is because the frame count (A+B) not satisfying the relation implies that the frame count (A+B) has a value at least equal to 2N. Then, the flow of the processing goes back to the step S3 following the step S2 of the flowchart shown in FIG. 12. If the frame count (A+B) satisfies the relation 0≦(A+B)<N/2, on the other hand, the CPU 11 produces a result of determination as to whether or not the frame count (A+B+C) satisfies the relation N/2≦(A+B+C)≦N.

If the frame count (A+B+C) does not satisfy the relation N/2≦(A+B+C)≦N, that is, if the frame count (A+B+C) satisfies the relation N<(A+B+C), the CPU 11 divides the section starting at the start position α on the stream A and ending at the end position γ of the immediately following GOP on the stream B into a plurality of such GOPs that the relation N/2≦x≦N holds true as explained earlier by referring to FIG. 5. Then, two or more GOPs are set and all the set GOPs are taken as the minimum re-encoded section. The immediately following GOP on the stream B is a GOP immediately lagging behind the reference re-encoded section. Then, the flow of the processing goes back to the step S3 following the step S2 of the flowchart shown in FIG. 12. In this case, the (A+B+C) frames are distributed to two GOP as uniformly as possible or, as described earlier, a predetermined frame count is set at x in the range N/2≦x≦N and the section starting at the start position a on the stream A and ending at the end position γ of the immediately following GOP on the stream B is divided into two GOPs that each of the GOPs includes x frames.

If the frame count (A+B+C) satisfies the relation N/2≦(A+B+C)≦N, on the other hand, the CPU 11 handles the extended re-encoded section as one GOP and takes the 1-GOP extended re-encoded section as a minimum re-encoded section. The extended re-encoded section is the reference re-encoded section plus a GOP immediately lagging behind the reference re-encoded section on the stream B. Then, the flow of the processing goes back to the step S3 following the step S2 of the flowchart shown in FIG. 12.

If the determination result produced at the step S65 indicates that the relation A≧N/2 holds true, the flow of the processing goes on to the step S72 as described earlier. At the step S72, the CPU 11 produces a result of determination as to whether or not the relation N/2≦B holds true.

If the determination result produced at the step S72 indicates that the relation N/2≦B holds true, the flow of the processing goes on to a step S73 at which the CPU 11 divides the reference re-encoded section into two GOPs on the assumption that the edit point a is a frame delimiter of the front GOP in the reference re-encoded section while the edit point b is a frame delimiter of the rear GOP in the reference re-encoded section as explained earlier by referring to FIG. 7, and takes the two GOPs as the minimum re-encoded section. Then, the flow of the processing goes back to the step S3 following the step S2 of the flowchart shown in FIG. 12.

It is to be noted that, if the process of the step S73 is carried out, when the CPU 11 transmits information to the other CPU 20 by way of the north bridge 12, the PCI bus 14, the PCI bridge 17 and the control bus 19 as parameters required for execution of a re-encoding process to be carried out on the minimum re-encoded section and the parameters required for execution of a re-encoding termination process to be carried out on the minimum re-encoded section at the step S7 of the flowchart shown in FIG. 12, the information also indicates that the first picture of a GOP lagging behind the edit point b in the display order in the minimum re-encoded section is set to coincide with an I2 picture or, in other words, B0 and B1 pictures are omitted.

If the determination result produced at the step S72 indicates that the relation N/2≦B does not hold true, on the other hand, the flow of the processing goes on to a step S74 at which the CPU 11 produces a result of determination as to whether or not the frame count (B+C) satisfies the relation N/2≦(B+C)≦N where symbol B denotes the number of frames included in a GOP lagging behind the edit point b in the reference re-encoded section on the assumption that the edit point b is a frame delimiter of the GOP whereas symbol C denotes the number of frames included in a GOP immediately lagging behind the reference re-encoded section on the stream B.

If the determination result produced at the step S74 indicates that the frame count (B+C) satisfies the relation N/2≦

(B+C)≦N, the flow of the processing goes on to a step S75 at which the CPU 11 adds the GOP lagging behind the reference re-encoded section on the stream B to the reference re-encoded section and takes the result of the addition as the minimum re-encoded section consisting of two GOPs. In this case, the portion leading ahead of the edit points in the minimum re-encoded section serves as the first GOP while the portion lagging behind the edit points in the minimum re-encoded section serves as the second GOP. Then, the flow of the processing goes back to the step S3 following the step S2 of the flowchart shown in FIG. 12.

If the determination result produced at the step S74 indicates that the frame count (B+C) does not satisfy the relation N/2≦(B+C)≦N, on the other hand, the flow of the processing goes on to a step S76 at which the CPU 11 produces a result of determination as to whether or not the frame count (B+C) satisfies the relation N/2>(B+C).

If the determination result produced at the step S76 indicates that the frame count (B+C) does not satisfy the relation N/2>(B+C), the flow of the processing goes on to a step S77 at which the CPU 11 adds the GOP lagging behind the reference re-encoded section on the stream B to the reference re-encoded section and takes the result of the addition as the minimum re-encoded section consisting of three GOPs. In this case, the portion leading ahead of the edit points in the minimum re-encoded section serves as the first GOP while the portion lagging behind the edit points in the minimum re-encoded section serves as the second and third GOPs. That is to say, the (B+C) frames included in the portion lagging behind the edit points in the minimum re-encoded section are distributed to the second and third GOPs. Then, the flow of the processing goes back to the step S3 following the step S2 of the flowchart shown in FIG. 12.

If the determination result produced at the step S76 indicates that the frame count (B+C) satisfies the relation N/2>(B+C), on the other hand, the flow of the processing goes on to a step S78 at which the CPU 11 produces a result of determination as to whether the number of frames included in a section to be re-encoded is equal to or greater than N/2. The section to be re-encoded is a section obtained most recently by sequentially adding subsequent GOPs lagging behind the reference re-encoded section on the stream B to the reference re-encoded section.

If the determination result produced at the step S78 indicates that the number of frames included in the section to be re-encoded is neither equal to nor greater than N/2, the CPU 11 adds a next subsequent GOP on the stream B to the section to be re-encoded to obtain a new section to be re-encoded. Then, the flow of the processing goes back to the step S78, and this process is carried out repeatedly till the number of frames included in the section obtained most recently as a section to be re-encoded is equal to or greater than N/2.

As the determination result produced at the step S78 indicates that the number of frames included in a section to be re-encoded is either equal to or greater than N/2, the flow of the processing goes on to a step S79 at which the CPU 11 takes the final section obtained most recently as the minimum re-encoded section consisting of two GOPs. Typically, the final section is a section obtained by sequentially adding a plurality of subsequent GOPs lagging behind the reference re-encoded section on the stream B to the reference re-encoded section. In this case, the portion leading ahead of the edit points in the minimum re-encoded section serves as the first GOP while the portion lagging behind the edit points in the minimum re-encoded section serves as the second GOP. Then, the flow of the processing goes back to the step S3 following the step S2 of the flowchart shown in FIG. 12.

As a result of the processing carried out to determine a minimum re-encoded section as described above, by considering the number of frames to be included in every GOP and the positions of the edit points, the configuration of every GOP can be provided so as to prevent the section from including a short GOP, which unnecessarily brings about deteriorations of the picture quality. Thus, the encoding efficiency can be increased and a coding process to result in a high picture quality can be expected.

As described above, at the step S66, the (A+B+C) frames are distributed to GOPs as uniformly as possible, or a predetermined frame count is set at x in the range N/2≦x≦N and the extended minimum re-encoded section is divided into GOPs so that each of the GOPs includes x frames. However, frames included in the reference re-encoded section can also be distributed as uniformly as possible.

Figure 17:
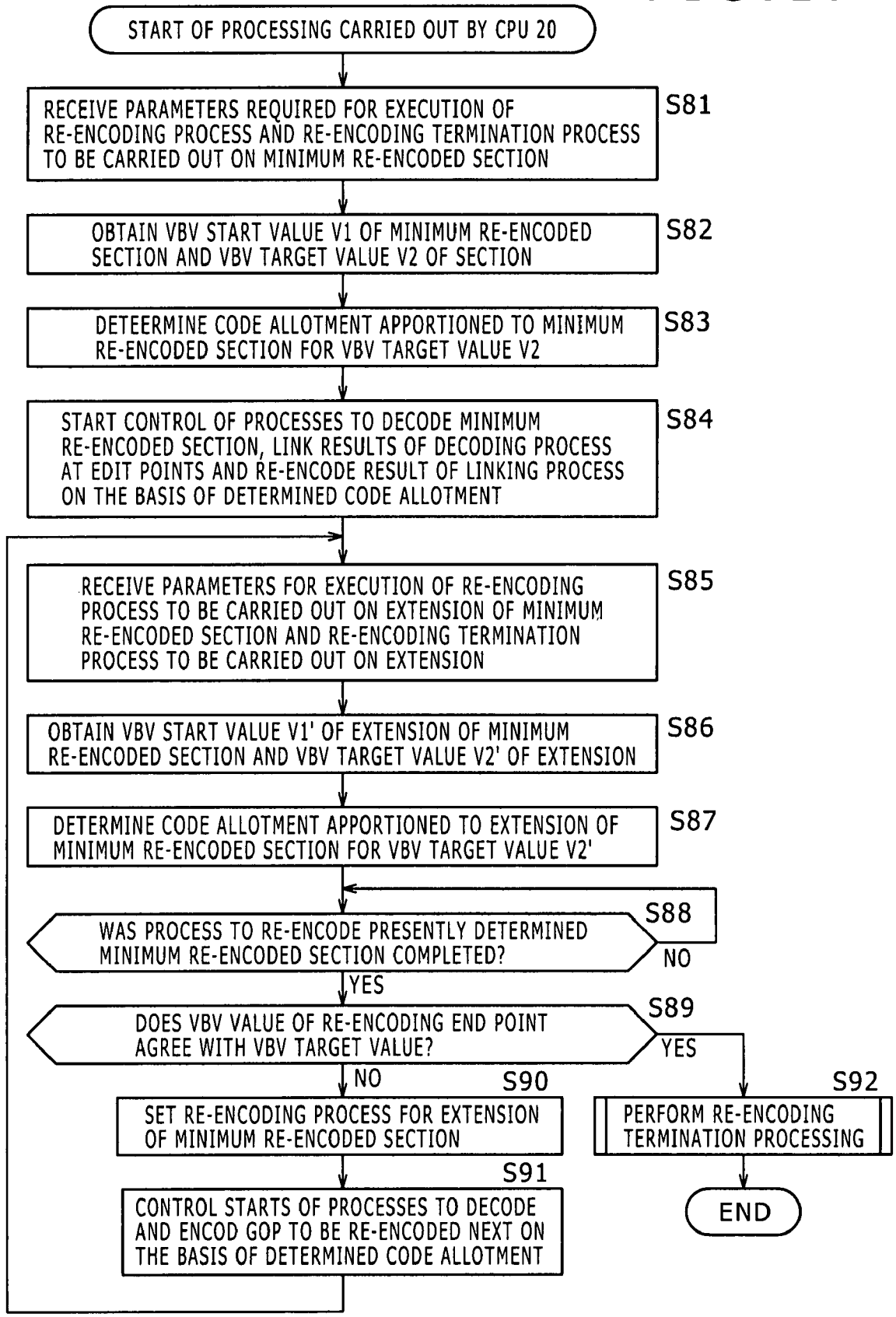
FIG. 17 shows a flowchart to be referred to in explanation of processing carried out by another CPU employed in the editing apparatus.

Next, processing carried out by the other CPU 20 is explained by referring to a flowchart shown in FIG. 17.

As shown in the figure, the flowchart begins with a step S81 at which the other CPU 20 receives parameters transferred by the CPU 11 at the step S7 of the flowchart shown in FIG. 12 as parameters required for execution of a re-encoding process to be carried out on a minimum re-encoded section and the parameters required for execution of a re-encoding termination process to be carried out on the minimum re-encoded section.

Then, at the next step S82, the other CPU 20 acquires a VBV start value V1 of the minimum re-encoded section and a VBV target value V2 of the section.

Subsequently, at the next step S83, the other CPU 20 determines a code allotment apportioned to the minimum re-encoded section for the VBV target value V2. In this case, any code-allotment determination method can be adopted.

Then, at the next step S84, the other CPU 20 starts control of processes to decode the minimum re-encoded section, link results of the decoding process at edit points and re-encode a result of the linking process on the basis of the determined code allotment. To put it in detail, on the basis of control signals received from the CPU 11 through the north bridge 12, the PCI bus 14, the PCI bridge 17 and the control bus 19, the other CPU 20 controls the PCI bridge 17, the stream splicer 25, the decoder 24 and the switch 29 so that partial data included in the stream A as data leading ahead of the minimum re-encoded section is supplied to the decoder 24 by way of the stream splicer 25 and the output of the decoder 24 is supplied to an external display apparatus or the like by way of the switch 29. The other CPU 20 also controls the PCI bridge 17, the decoder 22, the decoder 23, the effect/switch 26 and the encoder 27 so that data included in the minimum re-encoded section as data leading ahead of the edit point a on the stream A is supplied to the decoder 22, data included in the minimum re-encoded section as data lagging behind the edit point b on the stream B is supplied to the decoder 23, the effect/switch 26 links stream data obtained as a result of the decoding process carried out by the decoder 22 and stream data obtained as a result of the decoding process carried out by the decoder 23 to each other at the edit points a and b, if necessary, carries out an effect process, and outputs the result of the linking and effect processes to the external display apparatus or the like by way of the switch 29 and to the encoder 27 directly. In this case, if the stream data included in the stream B as data leading ahead of the edit point b includes a frame required for the process to be carried out by the decoder 23 to decode the data lagging behind the edit point b on the stream B, the frame is also supplied to the decoder 23.

It is to be noted that, if the relation (N+1)≦M≦(2N−1) and the relation A≧N/2 hold true where symbol M denotes the number of frames included in the minimum re-encoded section, symbol N denotes the number of frames included in one GOP serving as a reference on the streams and symbol A denotes the number of frames included in the reference re-encoded section as frames leading ahead of the edit point a on the stream A as described earlier, the other CPU 20 controls the encoder 27 so that the a GOP lagging behind the edit point b starts with an I2 picture in the display order.

Then, at the next step S85, the other CPU 20 receives parameters transferred by the CPU 11 at the step S12 of the flowchart shown in FIG. 13 as parameters required for execution of a re-encoding process to be carried out on an extension of the minimum re-encoded section and parameters required for execution of a re-encoding termination process to be carried out on the extension.

Then, at the next step S86, the other CPU 20 obtains a VBV start value V1' of the extension of the minimum re-encoded section and a VBV target value V2' of the extension.

Subsequently, at the next step S87, the other CPU 20 determines a code allotment apportioned to the extension of the minimum re-encoded section for the VBV target value V2'. In this case, any code-allotment determination method can be adopted.

Then, at the next step S88, the other CPU 20 produces a result of determination as to whether or not the process to re-encode the presently determined minimum re-encoded section has been completed. When the determination process of the step S88 is carried out for the first time, the presently determined minimum re-encoded section is typically the initial minimum re-encoded section without an extension GOP or the reference re-encoded section itself. In a subsequent determination process of the step S88, the presently determined minimum re-encoded section includes the initial minimum re-encoded section and a GOP serving as an extension of the minimum re-encoded section. If the determination result produced at the step S88 indicates that the process to re-encode the presently determined minimum re-encoded section has not been completed, the flow of the processing goes back to the step S88. As a matter of fact, the determination process of the step S88 is carried out repeatedly in a state of waiting for the process to re-encode the presently determined minimum re-encoded section to be completed.

As the determination result produced at the step S88 indicates that the process to re-encode the presently determined minimum re-encoded section has been completed, the flow of the processing goes on to a step S89 at which the other CPU 20 produces a result of determination as to whether or not the VBV value of the end point of the presently determined minimum re-encoded section agrees with the VBV target value.

If the determination result produced at the step S89 indicates that the VBV value of the end point of the presently determined minimum re-encoded section does not agree with the VBV target value, the processing goes on to a step S90 at which the other CPU 20 sets a re-encoding process for the extension of the minimum re-encoded section on the basis of the parameters obtained at the step S85 and the values obtained at the step S86. As described earlier, the parameters obtained at the step S85 are the parameters required for execution of a re-encoding process to be carried out on an extension of the minimum re-encoded section and the parameters required for execution of a re-encoding termination process to be carried out on the extension. On the other hand, the values obtained at the step S86 are the VBV start value V1' of the extension of the minimum re-encoded section and the VBV target value V2' of the extension.

Then, at the next step S91, the other CPU 20 controls the starts of processes to decode and encode the extension to be re-encoded next as an extension of the minimum re-encoded section on the basis of the code allotment determined at the step S87 for the extension of the minimum re-encoded section. Then, the flow of the processing goes back to the step S85 to repeat the execution of the processes of the step S85 and the subsequent steps.

If the determination result produced at the step S89 indicates that the VBV value of the end point of the presently determined minimum re-encoded section agrees with the VBV target value, that is, the continuation of the VBV buffer occupancies is sustained, on the other hand, the flow of the processing goes on to a step S92 at which the other CPU 20 carries out the re-encoding termination processing to be explained later by referring to a flowchart shown in FIG. 18 and ends the processing represented by the flowchart shown in FIG. 17.

By carrying out the processing represented by the flowchart shown in FIG. 17 as described above, at the step S89, the other CPU 20 produces a result of determination as to whether or not the VBV value of the end point of the presently determined minimum re-encoded section agrees with the VBV target value and, if the determination result produced at the step S89 indicates that the VBV value of the end point of the presently determined minimum re-encoded section does not agree with the VBV target value, the minimum re-encoded section is extended. Thus, a retry re-encoding process is not carried out. As a result, it is possible to improve responsiveness for cases such as an application in which an edited image was displayed in a real-time manner.

In addition, since information required for execution of a re-encoding process to be carried out on a next extension of the minimum re-encoded section can be obtained prior to the end of a process carried out on the present extended minimum re-encoded section, the processing is not delayed even if the present extended minimum re-encoded section was re-extended.

Figure 18:
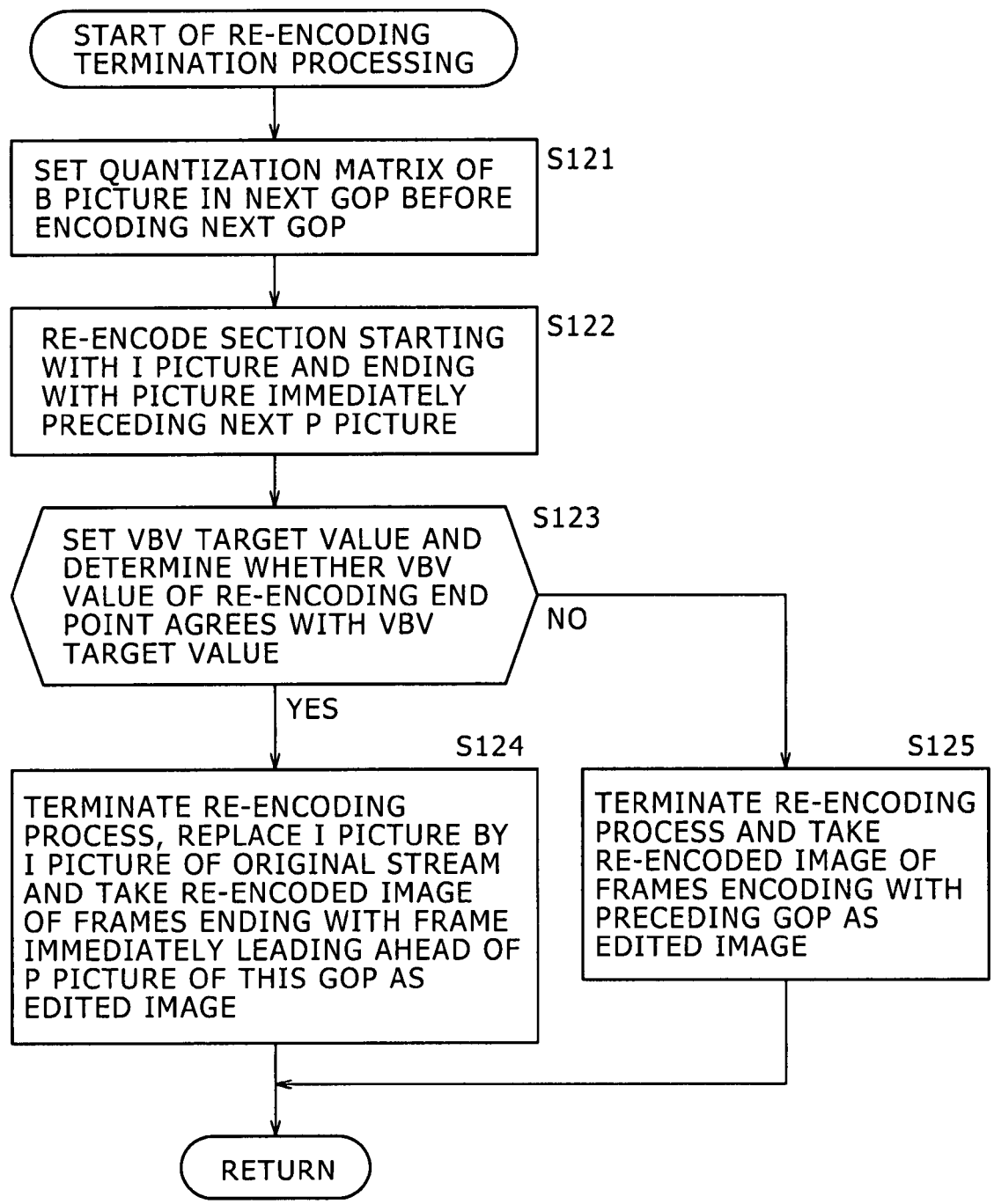
FIG. 18 shows a flowchart to be referred to in explanation of re-encoding termination processing.

By referring to the flowchart shown in FIG. 18, the following description explains the re-encoding termination processing carried out at the step S92 of the flowchart shown in FIG. 17.

As shown in FIG. 18, the flowchart begins with a step S121 at which the other CPU 20 sets a quantization matrix of a B picture included in the next GOP before encoding the next GOP.

Then, at the next step S122, the other CPU 20 re-encodes a section starting with an I picture and ending with a picture immediately leading ahead of the next P picture.

Then, at the next step S123, the other CPU 20 sets the VBV target value at the VBV value of a picture immediately leading ahead of the first P picture in the next GOP, and produces a result of determination as to whether or not the VBV value of the end point b of the minimum re-encoded section agrees with the VBV target value. The CPU produces a result of determination as to whether or not the VBV value of the end point b of the minimum re-encoded section agrees with the VBV target value by making use of the number of bits included in an I picture of the original stream such as the stream B shown in FIG. 4 or other figures.

If the determination result produced at the step S123 indicates that the VBV value of the end point b of the minimum re-encoded section agrees with the VBV target value, that is, the continuity of VBV buffer occupancies is sustained, the flow of the processing goes on to a step S124 at which the other CPU 20 controls a variety of units to terminate the re-encoding process, replace the I picture by an I picture of the original stream such as the stream B shown in FIG. 4 or other figures and take the re-encoded image of frames ending with a frame immediately leading ahead of the first P picture of this GOP as an edited image. Then, the flow of the processing goes back to the step S92 of the flowchart shown in FIG. 17 in order to end the processing represented by the flowchart shown in FIG. 17.

If the determination result produced at the step S123 indicates that the VBV value of the re-encoding end point b does not agree with the VBV target value, on the other hand, the flow of the processing goes on to a step S125 at which the other CPU 20 controls a variety of units to terminate the re-encoding process and take the re-encoded image of frames ending with the preceding GOP as an edited image. That is to say, the other CPU 20 controls a variety of units to carry out processing to take an I picture leading ahead of the first P picture on the original stream B supplied to the stream splicer 25 or a plurality of B pictures leading ahead of the first P picture as an edited image. In other words, a result of the re-encoding process carried out at the step S122 on a section starting with an I picture and ending with a picture immediately leading ahead of the next P picture is discarded. Then, the flow of the processing goes back to the step S92 of the flowchart shown in FIG. 17 in order to end the processing represented by the flowchart shown in FIG. 17.

By carrying out the processing described above, the minimum re-encoded section is extended to a frame immediately leading ahead of the next P picture if VBV buffer occupancies are found continuous at a frame delimiter of a GOP. Then, the re-encoding process is controlled so as to make VBV buffer occupancies continuous at the end point b of the extended minimum re-encoded section. In addition, if VBV buffer occupancies are found continuous at the next P picture, B pictures ending with that immediately leading ahead of the first P picture of the next GOP are added.

In the descriptions given so far, it is assumed that an MPEG method is adopted as the encoding technique. It is to be noted, however, that the present invention can of course be applied also to the case of an encoding process accompanying a frame correlation and an encoding process according to buffer modeling. In the case of AVC (Advanced Video Coding)/H.264 or the like, for example, the present invention is also applicable as well.

Figure 19:
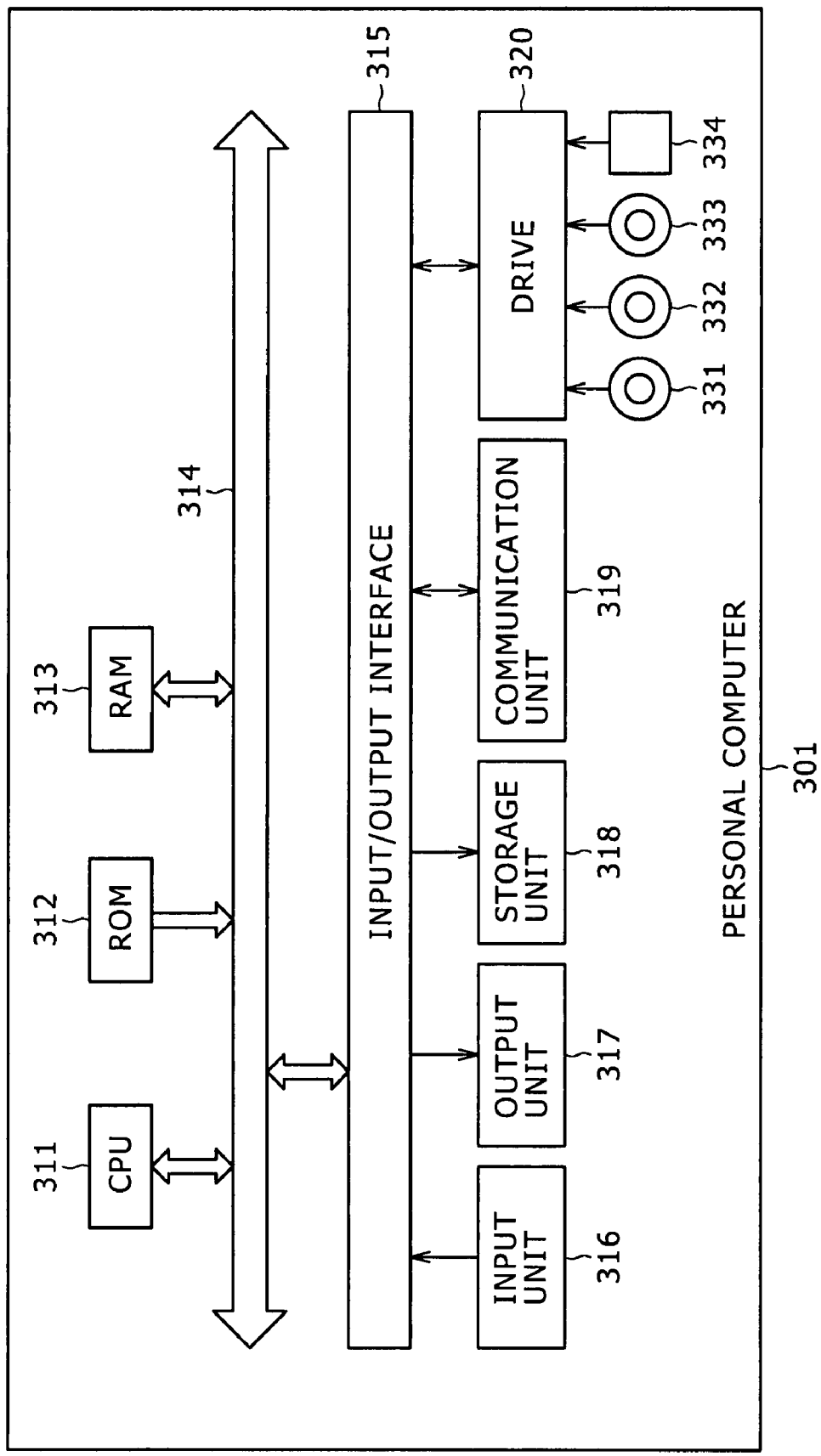
FIG. 19 is a block diagram showing the configuration of a personal computer.

The series of processes described so far can be carried out by hardware and/or by execution of software. If the series of processes described above is carried out by execution of software, programs composing the software can be installed into a computer embedded in dedicated hardware, a general-purpose personal computer or the like from typically a network or a recording medium. For example, a personal computer 301 like one shown in FIG. 19 is capable of serving as the editing apparatus 1 described above by referring to FIG. 3. A general-purpose personal computer is defined as a personal computer, which can be made capable of carrying out a variety of functions by installing a variety of programs into the personal computer.

In the personal computer 311 shown in FIG. 19, a CPU (Central Processing Unit) 311 carries out various kinds of processing by execution of programs stored in a ROM (Read Only Memory) 312 or programs loaded from a recording unit 318 into a RAM (Random Access Memory) 313. The RAM 313 is also used for properly storing various kinds of information such as data required in execution of the processing.

The CPU 311, the ROM 312 and the RAM 313 are connected to each other by a bus 314, which is also connected to an input/output interface 315.

The input/output interface 315 is connected to an input unit 316, an output unit 317, the recording unit 318 cited above and a communication unit 319. The input unit 316 includes a keyboard and a mouse whereas the output unit 317 includes a display unit and a speaker. The recording unit 318 includes a hard disk. The communication unit 319 has a modem or a terminal adaptor. The communication unit 319 is a unit for carrying out communication processing with other apparatus through the aforementioned network including the Internet.

If necessary, the input/output interface 315 is also connected to a drive 320 on which the recording medium cited above is mounted. The recording medium can be a magnetic disk 331, an optical disk 332, a magneto-optical disk 333 or a semiconductor memory 334. If necessary, a computer program to be executed by the CPU 311 is installed in advance from the recording medium into the storage unit 318.

As described above, if the series of processes described above is carried out by execution of software, programs composing the software can be installed into a computer embedded in dedicated hardware, a general-purpose personal computer or the like from typically the network or the recording medium.

The aforementioned recording medium for recording programs to be installed into a computer or a general-purpose personal computer as programs to be executed by the computer or the general-purpose personal computer respectively is a removable recording medium provided to the user separately from the main unit of the editing apparatus. Examples of the removable recording mediums also each referred to as a package medium include the magnetic disk 331 such as a flexible disk, the optical disk 332 such as a CD-ROM (Compact Disk-Read Only Memory) or a DVD (Digital Versatile Disk), the magneto-optical disk 333 such as an MD (Mini Disk) as well as the semiconductor memory 334. Instead of installing the programs from the removable recording mediums, the programs can also be stored in advance in an embedded recording medium included in the main unit of the editing apparatus. Examples of the embedded recording medium are a hard disk included in the storage unit 318 and the ROM 312.

It is also worth noting that, in this specification, steps of the flowchart described above can be carried out not only in a pre-prescribed order along the time axis, but also concurrently or individually.

Figure 20:
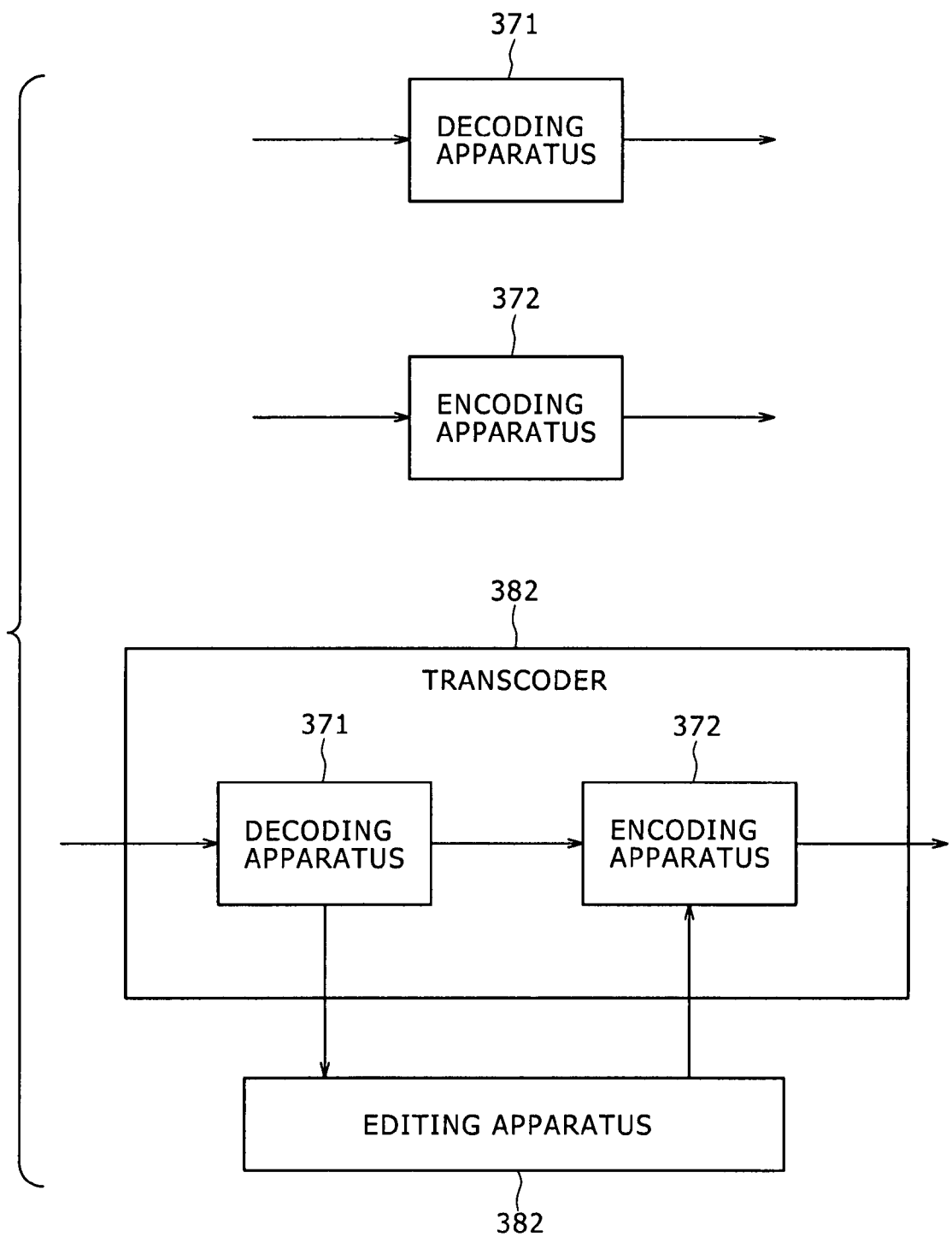
FIG. 20 is an explanatory diagram showing configurations of different apparatus to which the present invention can be applied.

In the embodiment described above, the editing apparatus 1 provided by the present invention has decoders and an encoder. It is to be noted, however, that the present invention can be applied to an editing apparatus 1 in which the decoders and the encoder are each provided as an independent unit. As shown in FIG. 20, for example, a decoding apparatus 371 and an encoding apparatus 372 are provided as units independent of each other. The decoding apparatus 371 is an apparatus for decoding stream data into a base band signal whereas the encoding apparatus 372 is an apparatus used for re-encoding the base band signal back into stream data.

To put it in detail, the decoding apparatus 371 not only decodes compressed and encoded data serving as raw video data, supplying a base band signal obtained as a result of the decoding process to the encoding apparatus 372 for re-encoding the base band signal, but also receives edited and compressed/encoded data obtained as a result of a partial re-encoding process carried out by the encoding apparatus 372 and is capable of decoding the edited and compressed/encoded data in order to convert the data into a base band signal in accordance with the present invention. The base band signal obtained as a result of decoding the stream of edited and compressed/encoded data is supplied to a display apparatus for displaying the stream or to another apparatus for carrying out a necessary process on the stream.

In addition, in another embodiment of the present invention, the decoders 22 to 24 each carry out an incomplete decoding process on input compressed and coded data whereas the encoder 27 carries out a partial encoding process on results of the incomplete decoding processes.

For example, in the other embodiment, the decoders 22 to 24 each carry out only decoding and inverse-coding processes on VLC code, omitting an inverse DCT conversion process. In this case, the encoder 27 carries out only quantization and variable-length encoding processes, omitting a DCT conversion process. It is needless to say that the present invention can also be applied to a case in which the encoder carries out only such a partial encoding process, which is an encoding process starting from a middle stage.

On top of that, in a further embodiment of the present invention, the decoders 22 to 24 each carry out a complete decoding process to generate a base band signal as a result of the decoding process whereas the encoder 27 carries out a re-encoding process up to a middle stage by, for example, performing the DCT conversion and quantization processes but omitting the variable-length encoding process. Moreover, in a still further embodiment of the present invention, the decoders 22 to 24 each carry out an incomplete decoding process to generate data encoded up to a middle stage whereas the encoder 27 carries out a re-encoding process up to a middle stage to produce completely encoded data. For example, the decoders 22 to 24 each carry out only the decoding and inverse-coding processes on VLC code, omitting an inverse DCT conversion process whereas the encoder 27 carries out only the quantization process, omitting the variable-length encoding process.

Furthermore, in a configuration to which the present invention is applied as shown in FIG. 20, the decoding apparatus 371 carries out an incomplete complete decoding process on stream data supplied thereto whereas the encoding apparatus 372 carries out a partial re-encoding process on a portion corresponding to data obtained as a result of the incomplete decoding process.

Let us assume for example that the decoding apparatus 371 carries out only the decoding and inverse-coding processes on VLC code, omitting the inverse DCT conversion process whereas the encoding apparatus 372 carries out only the quantization and variable-length encoding processes, omitting the DCT conversion process. It is needless to say that the present invention can be applied to the decoding and inverse-coding processes carried out by the decoding apparatus 371 as a partial decoding process up to a middle stage and the quantization and variable-length encoding processes carried out by the encoding apparatus 372 as a partial re-encoding process starting from a middle stage.

In addition, the present invention can also be applied to a case in which a base band signal obtained as a result of a complete decoding process carried out by the decoding apparatus 371 is subjected to a re-encoding process up to a middle stage (such as only the quantization and DCT conversion processes without the variable-length encoding process) in the encoding apparatus 372, a case in which data output by an incomplete decoding process (such as only the decoding and inverse-coding processes carried out on VLC code without the inverse DCT conversion process) carried out by the decoding apparatus 371 as a signal encoded up to a middle stage is further subjected to a re-encoding process up to a middle stage (such as the quantization process without the variable-length encoding process) in the encoding apparatus 372 or another similar case.

In addition, the present invention can also be applied to a transcoder 381 employing a decoding apparatus 371 for carrying out partial decoding processing including some processes of the decoding processing, and an encoding apparatus 372 for carrying out partial encoding processing including some processes of the encoding processing. Such a transcoder 381 can be used in conjunction with an editing apparatus 382 for carrying out an editing process such as splicing. The editing apparatus 382 is an editing apparatus capable of carrying out functions of the stream splicer 25 and the effect/switch 26, which are employed in the editing apparatus 1.

On top of that, while the CPU 11 and the other CPU 20 are provided separately in the embodiment described above, the implementation of the present invention is by no means limited to such an embodiment. For example, in a conceivable still further embodiment of the present invention, the CPU 11 and the other CPU 20 are integrated to form one CPU. By the same token, in the embodiment described above, the memory 13 and the memory 21 are provided separately. However, the implementation of the present invention is by no means limited to such an embodiment. For example, in a conceivable still further embodiment of the present invention, the memory 13 and the memory 21 are integrated to form one memory.

In addition, while the HDD 16, the decoders 22 to 24, the stream splicer 25, the effect/switch 26, the encoder 27, the input terminal 28 and the switch 29 are connected to each other by using bridges and buses in the embodiment described above, being integrated to form an editing apparatus, the configuration of the present invention is by no means limited to such an embodiment. For example, some of these units employed in the configuration can be connected to an external apparatus by radio or wire means, or can be connected each other to create one of a variety of connection forms.

On top of that, while compressed raw data to be edited is stored in an HDD in the case of the embodiment described above, implementation of the present invention is by no means limited to such an embodiment. For example, the present invention can be applied to a case in which the editing process is carried out on raw data stored in a variety of recording mediums such as an optical disk, a magneto optical disk, a semiconductor memory and a magnetic disk.

In addition, while the decoders 22 to 24, the stream splicer 25, the effect/switch 26, the encoder 27, the input terminal 28 and the switch 29 are mounted on the same extension card such as a PCI card or a PCI-Express card in the embodiment described above, implementation of the present invention is by no means limited to such an embodiment. For example, for a high transfer speed between cards by virtue of a technology such as the PCI-Express technology, the units can be mounted on their respective cards separated from each other.

It is also to be noted that the technical term 'system' used in this specification implies the configuration of a plurality of apparatus.

It is also worth noting that the embodiment described above is no more than a typical embodiment of the present invention. It is possible to provide a variety of modified versions of the embodiment without departing from essentials of the present invention.

In addition, it should be understood by those skilled in the art that a variety of modifications, combinations, sub-combinations and alterations may occur in dependence on design requirements and other factors insofar as they are within the scope of the appended claims or the equivalents thereof.

What is claimed is:

1. An information-processing apparatus for splicing a first encoded stream and a second encoded stream at a first splicing point set on said first encoded stream and a second splicing point set on said second encoded stream, said information-processing apparatus comprising:
- a decoding unit configured to decode a first part included in a re-encoding section as a part including said first splicing point set on said first encoded stream in order to generate a first base band signal and a second part included in said re-encoding section as a part including said second splicing point set on said second encoded stream in order to generate a second base band signal;
- an encoding unit configured to encode an edited signal obtained as a result of splicing said first base band signal and said second base band signal, which are generated by said decoding unit, at said first and second splicing points in order to generate a re-encoded stream; and
- a control unit configured to add a predetermined section, which is included in said second encoded stream as a section immediately lagging behind said re-encoding section, to said re-encoding section as a re-encoding extension of said re-encoding section in case continuity between the occupancy of the end point of said re-encoded stream generated by said encoding unit and the occupancy of a portion included in said second encoded stream as a portion corresponding to said end point is not sustained,
- wherein the encoding unit re-encodes both the re-encoding extension and the re-encoding section to generate the re-encoded stream to have the continuity maintained at a first P picture of the re-encoding extension.

2. The information-processing apparatus according to claim 1 wherein said encoding unit carries out an encoding process conforming to an MPEG long GOP format and said re-encoding extension of said re-encoding section is one GOP.

3. The information-processing apparatus according to claim 1, said information-processing apparatus further including a stream-supply control unit configured to control an operation to supply said first encoded stream and said second encoded stream to said decoding unit, wherein said stream-supply control unit controls an operation to supply said predetermined section included in said second encoded stream as a section immediately lagging behind said re-encoding section to said decoding unit while said encoding unit is generating said re-encoded stream for said re-encoding section.

4. The information-processing apparatus according to claim 1 wherein:
- said encoding unit carries out an encoding process conforming to an MPEG long GOP format; and
- if said continuity of said occupancies is sustained, said control unit further adds a picture sequence ending with a frame immediately leading ahead of the first P picture of the next GOP immediately lagging behind said re-encoding section as said re-encoding extension to be re-encoded to said re-encoding section.

5. The information-processing apparatus according to claim 1 wherein:
- said encoding unit carries out an encoding process conforming to an MPEG long GOP format;
- said control unit takes a section starting from the start position of a GOP including said first splicing point set on said first encoded stream and ending at the end position of a GOP including said second splicing point set on said second encoded stream as a reference re-encoding section; and
- said control unit determines said re-encoding object section on the basis of the number of pictures included in said reference re-encoding object section.

6. The information-processing apparatus according to claim 5 wherein said control unit takes said reference re-encoding section as said re-encoding section if the relation $N/2 \leq M \leq N$ holds true where symbol M denotes the number of pictures included in said reference re-encoding section whereas symbol N denotes the number of pictures included in one GOP serving as a reference.

7. The information-processing apparatus according to claim 5 wherein said control unit takes a section consisting of said reference re-encoding section and one GOP added to said reference re-encoding section as said re-encoding section if the relation $0 \leq M < N/2$ holds true where symbol M denotes the number of pictures included in said reference re-encoding section whereas symbol N denotes the number of pictures included in one GOP serving as a reference on said streams.

8. The information-processing apparatus according to claim 5 wherein said control unit divides said reference re-encoding section into a plurality of GOPs and takes said reference re-encoding section as said re-encoding section if the relation $(N+1) \leq M \leq (2N-1)$ holds true where symbol M denotes the number of pictures included in said reference re-encoding section whereas symbol N denotes the number of pictures included in one GOP serving as a reference on said streams.

9. The information-processing apparatus according to claim 5 wherein said control unit divides said reference re-encoding section into two GOPs sandwiching said first and second splicing points if the relation $(N+1) \leq M \leq (2N-1)$ and the relation $A \geq N/2$ hold true where symbol M denotes the number of pictures included in said reference re-encoding section, symbol N denotes the number of pictures included in one GOP serving as a reference and symbol A denotes the number of pictures located between the start position of a GOP including said first splicing point on said first encoded stream and said first splicing point.

10. The information-processing apparatus according to claim 9 wherein said encoding unit carries out an encoding process to generate a re-encoded stream in such a way that the time-wise later one of said two GOPs sandwiching said first and second splicing points starts from the first I picture in a display order.

11. The information-processing apparatus according to claim 9 wherein said control unit takes a section consisting of said reference re-encoding section and one GOP added to said reference re-encoding section as said re-encoding section if the relation $N/2 \leq R$ does not hold true and takes said reference re-encoding section as said re-encoding section if the relation $N/2 \leq R$ holds true where symbol R denotes the number of pictures included in the time-wise later one of said two GOPs sandwiching said first and second splicing points.

12. An information processing method for splicing a first encoded stream and a second encoded stream at a first splicing point set on said first encoded stream and a second splicing point set on said second encoded stream, said information-processing method comprising the steps of:
- decoding a first part included in a re-encoding section as a part including said first splicing point set on said first encoded stream in order to generate a first base band signal and a second part included in said re-encoding section as a part including said second splicing point set on said second encoded stream in order to generate a second base band signal;
- encoding an edited signal obtained as a result of splicing said first base band signal and said second base band signal at said first and second splicing points in order to generate a re-encoded stream; and adding a predetermined section, which is included in said second encoded stream as a section immediately lagging behind said re-encoding section, to said re-encoding section as a re-encoding extension of said re-encoding section in case continuity between the occupancy of the end point of said re-encoded stream and the occupancy of a portion included in said second encoded stream as a portion corresponding to said end point is not sustained, re-encoding both the re-encoding extension and the re-encoding section to generate the re-encoded stream to have the continuity maintained at a first P picture of the re-encoding extension.

13. An information-processing apparatus for splicing a first encoded stream and a second encoded stream at a first splicing point set on said first encoded stream and a second splicing point set on said second encoded stream, said information-processing apparatus comprising:

a decoding unit configured to decode a first part included in a re-encoding section as a part including said first splicing point set on said first encoded stream in order to generate a first base band signal and a second part included in said re-encoding section as a part including said second splicing point set on said second encoded stream in order to generate a second base band signal;

an encoding unit configured to encode an edited signal obtained as a result of splicing said first base band signal and said second base band signal at said first and second splicing points in order to generate a re-encoded stream; and a control unit configured to take a section starting from the start position of a GOP including said first splicing point set on said first encoded stream and ending at the end position of a GOP including said second splicing point set on said second encoded stream as a reference re-encoding section and determine whether to add a re-encoding extension that is a section included in said second encoded stream immediately lagging behind said re-encoding section said re-encoding section on the basis of the number of pictures included in said reference re-encoding section, wherein the encoding unit re-encodes both the re-encoding extension and the re-encoding section to generate the re-encoded stream to have the continuity maintained at a first P picture of the re-encoding extension.

14. An information processing method for splicing a first encoded stream and a second encoded stream at a first splicing point set on said first encoded stream and a second splicing point set on said second encoded stream, said information-processing method comprising the steps of:

decoding a first part included in a re-encoding section as a part including said first splicing point set on said first encoded stream in order to generate a first base band signal and a second part included in said re-encoding section as a part including said second splicing point set on said second encoded stream in order to generate a second base band signal;

encoding an edited signal obtained as a result of splicing said first base band signal and said second base band signal at said first and second splicing points in order to generate a re-encoded stream; and taking a section starting from the start position of a GOP including said first splicing point set on said first encoded stream and ending at the end position of a GOP including said second splicing point set on said second encoded stream as a reference re-encoding section and determining said re-encoding section on the basis of the number of pictures included in said reference re-encoding section, wherein the encoding step the encoding unit re-encodes both the re-encoding extension and the re-encoding section to generate the re-encoded stream to have the continuity maintained at a first P picture of the re-encoding extension.

15. The information-processing apparatus according to claim 1, wherein the control unit determines a minimum re-encoded section and divides the minimum re-encoded section into a plurality of sections.

16. The information-processing apparatus according to claim 15, wherein among the plurality of sections, a time-wise later section includes equal or more frames than a time-wise earlier section.

17. The information processing method according to claim 12, further comprising a determining step of determining a minimum re-encoded section and dividing the minimum re-encoded section into a plurality of sections.

18. The information-processing method according to claim 17, wherein among the plurality of sections, a time-wise later section includes equal or more frames than a time-wise earlier section.

* * * * *